United States Patent
Martin et al.

(10) Patent No.: US 7,022,759 B2
(45) Date of Patent: *Apr. 4, 2006

(54) AQUEOUS POLYESTER COATING COMPOSITIONS

(75) Inventors: Emilio Martin, Waalwijk (NL); Gerardus Cornelis Overbeek, Waalwijk (NL); John Christopher Padget, Frodsham (GB); Pablo Steenwinkel, Waalwijk (NL); Petrus Johannes Maria Van Oorschot, Waalwijk (NL); Ronald Tennebroek, Waalwijk (NL)

(73) Assignee: Avecia BV, Waalwijk (NL)

( * ) Notice: Subject to any disclaimer, the term of this patent is extended or adjusted under 35 U.S.C. 154(b) by 99 days.

This patent is subject to a terminal disclaimer.

(21) Appl. No.: 10/380,952

(22) PCT Filed: Oct. 11, 2001

(86) PCT No.: PCT/GB01/04504

§ 371 (c)(1),
(2), (4) Date: Mar. 20, 2003

(87) PCT Pub. No.: WO02/33008

PCT Pub. Date: Apr. 25, 2002

(65) Prior Publication Data

US 2003/0191231 A1    Oct. 9, 2003

(30) Foreign Application Priority Data

Oct. 14, 2000 (GB) .................................. 0025213

(51) Int. Cl.
- *C09D 167/02* (2006.01)
- *C09D 123/00* (2006.01)
- *C09D 131/00* (2006.01)
- *C09D 133/00* (2006.01)

(52) U.S. Cl. ........................................ 524/513; 524/501

(58) Field of Classification Search ................ 524/501, 524/513, 514, 529–536, 538, 539, 600–608
See application file for complete search history.

(56) References Cited

U.S. PATENT DOCUMENTS

| | | | |
|---|---|---|---|
| 4,299,742 A | 11/1981 | Belder et al. | |
| RE31,985 E * | 9/1985 | Hayashi et al. | 523/501 |
| 4,552,908 A | 11/1985 | Nicks et al. | |
| 4,647,610 A | 3/1987 | Sperry et al. | |
| 5,137,961 A * | 8/1992 | Goos et al. | 524/457 |
| 5,378,757 A | 1/1995 | Blount, Jr. et al. | |
| 6,579,932 B1 * | 6/2003 | Schipper et al. | 524/501 |

FOREIGN PATENT DOCUMENTS

| | | |
|---|---|---|
| EP | 0799259 B1 * | 7/1999 |
| WO | WO 97/26303 A1 * | 7/1997 |
| WO | WO 98/08894 | 3/1998 |
| WO | WO 00/056826 A1 * | 9/2000 |

* cited by examiner

*Primary Examiner*—Matthew A. Thexton
(74) *Attorney, Agent, or Firm*—Morgan, Lewis & Bockius LLP

(57) ABSTRACT

An aqueous coating composition comprising a crosslinkable water-dispersible polyester oligomer wherein said composition when drying to form a coating has the following properties: an open time of at least 20 minutes, a wet edge time of at least 10 minutes, a thumb hard time of $\leq 48$ hours and a tack-free time $\leq 20$ hours and an equilibrium viscosity of $\leq 5000$ Pa.s at any solids content when drying in the range of from 20 to 55 wt % using a shear rate in the range of from $9\pm0.5$ to $90\pm5$ s$^{-1}$ and at $23\pm2°$ C.

26 Claims, 2 Drawing Sheets

Shear rate 0.0997 s⁻¹

Shear rate 0.990 s⁻¹

Shear rate 9.97 s-1

Shear rate 78.6 s-1

AQUEOUS POLYESTER COATING COMPOSITIONS

The present invention relates to certain aqueous ambient temperature crosslinkable and shelf stable polyester polymer compositions which, inter alia, provide coatings having improved open and wet edge times as well as good tack-free times.

A general need when applying a decorative or protective coating to a substrate is to be able to repair irregularities in the still-wet coating after some time has elapsed, for example by re-brushing over a freshly coated wet substrate, or by applying more of the coating composition over a previously coated substrate either over the main area of the coating or an edge of the coating or even blending a drop into the coating without vitiating the complete merging of any boundaries in the vicinity of the repaired irregularity. Traditionally compositions containing binder polymers dissolved in organic solvents are used and the organic solvents are employed to modify the drying characteristics of the coated composition. For example, organic solvent based alkyds with an open time of 30 to 45 minutes are available in the decorative "Do-it-yourself" DIY market. However the disadvantage of organic solvent based coatings is the toxic and flammable nature of such solvents and the pollution and odour caused on evaporation as well as the relatively high cost of organic solvents.

Thus with the continuing concern about the use of organic solvent based coating compositions there has been a long felt need for an aqueous coating composition with comparable properties to those achievable using organic solvent based compositions.

Unfortunately, aqueous polymer coating compositions currently known to the art do not offer a combination of drying properties which would make them fully comparable (or even superior to) solvent-based coatings, and in particular do not provide desirably long open and wet edge times (as discussed above and also later) together with desirably short tack-free times (discussed later).

Thus, very commonly, aqueous-based polymer coating compositions employ dispersed high molecular weight polymers as the binder materials thereof. This results in, inter alia, a short wet edge time when the coating composition is dried because the dispersed polymer particles tend to coalesce in the edge region of an applied coating very soon after a wet coating has been applied (probably due to the maximum packing fraction of the polymer particles having been reached) to form a continuous film, and since the polymer of this film is of high viscosity because of its high molecular weight, the lapping (i.e. wet edge) time of the composition is poor.

It has been shown by viscosity measurements taken during drying that existing alkyd emulsions have a high viscosity phase inversion peak during drying. (Phase inversion is defined as the transition from a binder in a continuous water phase to water in a continuous binder phase which occurs during drying). The consequence is a difficulty in re-brushing which starts a few minutes after application of the coating.

It is known from the prior art that longer wet edge or open time is achievable by using solution-type aqueous oligomers (U.S. Pat. No. 4,552,908) which can be diluted with large amounts of organic solvent(s) in order to create a low viscosity continuous phase during drying of the film. However, these systems have high Volatile Organic Contents (VOC's) and are generally unacceptably water-sensitive.

Open time can also be prolonged by using evaporation suppressants (such as e.g. eicosanol), as described in for example EP 210747. However, water sensitivity is also a problem in this case. Moreover, the wet edge open time is insufficiently improved by using such evaporation suppressants.

From the literature it is also known that open time is easily prolonged by using low solids contents in the aqueous polymer compositions, but this generally results in the need to apply many layers of paint (for good opacity). In addition, the wet edge time is generally only moderately influenced by reducing the solids content of an aqueous coating composition with water.

Longer times for repairing irregularities can be achieved by employing aqueous coating compositions in which the binder polymers have very low viscosities. However, hitherto, a problem with such low viscosity polymer binders, is that the resultant coatings have a slow drying rate, resulting in the coating remaining tacky for an unacceptably long time. A coating should also preferably dry sufficiently quickly to avoid the adherence of dust and to ensure that the coating quickly becomes waterproof (in case of outdoor applications), and as discussed above quickly becomes tack-free and sufficiently hard.

Indeed, the difficulty in developing aqueous polymer coating compositions having a desirable combination of drying properties when coated onto a substrate has been particularly discussed in a recent interview given by Professor Rob van der Linde (Professor of Coatings Technology, University of Technology, Eindhoven, NL) and Kees van der Kolk (Sigma Coatings) and reported in "Intermediair" 10.06.1999, 35(23), pages 27–29. In this interview, concerning environmentally friendly paints, there is described the problem of applying aqueous paints where even the professional painter has little enough time to correct any irregularities when needed. This is contrasted (in the interview) with solvent-based paints (e.g. alkyd paints) which are workable for a much longer time but have the disadvantage that the organic solvents, forming a major component of such compositions, are toxic and expensive. The interview also mentions that in the coming years, three universities will cooperate in a project to overcome the drying disadvantages of aqueous paints. Thus this interview emphasises the current and continuing need and desirability for achieving aqueous polymer coatings compositions having improved drying properties.

The open time for a coating composition is, in brief, the period of time that the main area (the bulk) of an applied aqueous coating remains workable after it has been applied to a substrate, in the sense that during this period re-brushing or application of more coating over the main area of a freshly coated wet substrate is possible without causing defects such as brush marks in the final dried coating. (A more formal definition of open time is provided later in this specification).

The wet edge time for a coating composition is the period of time that the edge region of an applied aqueous coating remains workable after it has been applied to a substrate, in the sense that during this period re-brushing or application of more coating over the edge region of a freshly coated wet substrate is possible without causing defects such as lap lines in the final dried coating. (A more formal definition of wet edge time is provided later in this specification).

U.S. Pat. No.4,552,908 describes a solids/viscosity relationship of oligomers with defined molecular weight upon drying coatings applied from compositions containing the oligomers. The compositions have >10 minutes wet edge time, but there is no mention that the oligomers are crosslinkable (an important feature of the present invention—see later). All oligomers mentioned in the patent are very water-sensitive.

WO 97/26303 discloses a water-borne hybrid composition comprising an emulsifiable resin, an aqueous polymer dispersion and surfactant where the composition has a dry solids content of 60 to 90% by weight. However no drying properties are exemplified or described.

WO 00/24837 discloses a polyurethane/acrylate dispersion blended with a polyurethane with oxidatively drying groups; however the maximum open time was only 7 minutes, and, in particular, a wet edge time of only 4 minutes was achieved, neither of which is sufficient for most decorative purposes.

U.S. Pat. No.4,346,044 discloses water-soluble air drying alkyds, however a high solvent content is required and no drying properties are exemplified.

We have now invented aqueous polymer coating compositions having a very advantageous combination of drying properties, particularly with regard to open time and tack-free time as discussed above, and which (surprisingly in view of the comments by van der Linde and van der Kolk) avoid the drawbacks of the currently available compositions.

According to the present invention there is provided an aqueous coating composition comprising a crosslinkable water-dispersible polyester oligomer(s) wherein said composition when drying to form a coating has the following properties:

i) an open time of at least 20 minutes;
ii) a wet-edge time of at least 10 minutes;
iii) a thumb hard time of $\leq 48$ hours;
iv) a tack-free time of $\leq 20$ hours;
v) 0 to 25% of co-solvent by weight of the composition; and
vi) an equilibrium viscosity of $\leq 5,000$ Pa.s, at any solids content when drying in the range of from 20 to 55% by weight of the composition, using any shear rate in the range of from $9\pm0.5$ $s^{-1}$ to $90\pm5$ $s^{-1}$ and at $23\pm2°$ C.

Open time is more formally defined as the maximum length of time, using the test method, under the specified conditions described herein, in which a brush carrying the aqueous composition of the invention can be applied to the main area of a coating of the aqueous composition of the invention after which the coating flows back so as to result in a homogenous film layer.

Preferably the open time is at least 25 minutes, more preferably at least 30 minutes and most preferably at least 35 minutes.

Wet edge time is more formally defined as the maximum length of time, using the test method, under the specified conditions described herein, in which a brush carrying the aqueous composition of the invention can be applied to the edge region of a coating of the aqueous composition of the invention after which the coating flows back without leaving any lap lines so as to result in a homogenous film layer.

Preferably the wet-edge time is at least 12 minutes, more preferably at least 15 minutes and especially at least 25 minutes.

The drying process can be divided in four stages namely the period of time necessary to achieve dust-free, tack-free, sandable and thumb-hard coatings using the tests described herein.

Preferably the dust free time is $\leq 4$ hours, more preferably $\leq 2$ hours and most preferably $\leq 50$ minutes.

Preferably the tack-free time is $\leq 15$ hours, preferably $\leq 12$ hours, more preferably $\leq 10$ hours and most preferably $\leq 8$ hours.

Preferably the thumb hard time is $\leq 24$ hours, most preferably $\leq 16$ hours and especially $\leq 10$ hours.

Preferably the resultant coating is sandable within 72 hours, more preferably within 48 hours, still more preferably within 24 hours, and especially within 16 hours.

A co-solvent as is well known in the coating art, is an organic solvent employed in an aqueous composition to improve the drying characteristics thereof.

The co-solvent may be solvent incorporated or used during preparation of the polyester oligomer(s) or may have been added during formulation of the aqueous composition.

The equilibrium viscosity of the aqueous coating composition when measured under the conditions as described above, is a suitable method for illustrating the drying characteristics of the aqueous coating composition. By the equilibrium viscosity of an aqueous composition at a particular shear rate and solids content is meant the viscosity measured when the aqueous composition has been subjected to the shear rate at for long enough to ensure that the viscosity measurement has reached a constant value.

If the composition is to remain brushable and workable during drying so that it has the desired open time and wet edge time, it is necessary that its equilibrium viscosity does not exceed defined limits during the drying process and hence over a range of solids contents. Accordingly the crosslinkable water-dispersible polyester oligomer(s) which are used in this invention do not give a significant phase inversion viscosity peak, if any at all, during the drying process when the system inverts from one in which water is the continuous phase to one in which the crosslinkable water-dispersible polyester oligomer(s) is the continuous phase.

The shear rate to measure the equilibrium viscosity is preferably any shear rate in the range of from $0.9\pm0.05$ to $90\pm5$ $s^{-1}$, more preferably any shear rate in the range of from $0.09\pm0.005$ to $90\pm5$ $s^{-1}$.

Preferably the equilibrium viscosity of the aqueous coating composition of the invention is $\leq 3000$ Pa.s, more preferably $\leq 1500$ Pa.s, still more preferably $\leq 500$ Pa.s, especially $\leq 100$ Pa.s and most especially $\leq 50$ Pa.s when measured as defined above.

Preferably, the composition of the invention has an equilibrium viscosity $\leq 5,000$ Pa.s when measured using any shear rate in the range of from $0.09\pm0.005$ to $90\pm5$ $s^{-1}$, and an equilibrium viscosity of $\leq 3,000$ Pa.s when measured using any shear rate in the is range of from $0.9\pm0.05$ to $90\pm5$ $s^{-1}$, and an equilibrium viscosity of $\leq 1,500$ Pa.s when measured using any shear rate in the range of from $9\pm0.5$ to $90\pm5$ $s^{-1}$, at any solids content when drying in the range of from 20 to 55% by weight of the composition and at $23\pm2°$ C.

More preferably, the composition of the invention has an equilibrium viscosity of $\leq 3,000$ Pa.s when measured using any shear rate in the range of from $0.09\pm0.005$ to $90\pm5$ $s^{-1}$, and an equilibrium viscosity of $\leq 1,500$ Pa.s when measured using any shear rate in the range of from $0.9\pm0.05$ to $90\pm5$ $s^{-1}$, and an equilibrium viscosity of $\leq 500$ Pa.s when measured using any shear rate in the range of from $9\pm0.5$ to $90\pm5$ $s^{-1}$, at any solids content when drying in the range of from 20 to 55% by weight of the composition and at $23\pm2°$ C.

Most preferably, the composition of the invention has an equilibrium viscosity of $\leq 1500$ Pa.s when measured using any shear rate in the range of from $0.09\pm0.005$ to $90\pm5$ $s^{-1}$, and an equilibrium viscosity of $\leqq 200$ Pa.s when measured using any shear rate in the range of from $0.9\pm0.05$ to $90\pm5$ s$^{-1}$, and an equilibrium viscosity of $\leqq 100$ Pa.s when measured using any shear rate in the range of from $9\pm0.5$ to $90\pm5$ s$^{-1}$, at any solids content when drying in the range of from 20 to 55% by weight of the composition and at $23\pm2°$ C.

Preferably the equilibrium viscosity of the composition of the invention is $\leqq 5000$ Pa.s, more preferably $\leqq 3000$ Pa.s when measured using any shear rate in the range of from $0.9\pm0.05$ to $90\pm5$ s$^{-1}$, more preferably using any shear rate in the range of from $0.09\pm0.005$ to $90\pm5$ s$^{31\ 1}$, after a 12%, preferably a 15% and most preferably a 18% increase in the solids content by weight of the composition.

A 12% increase in the solids content by weight of the composition means for example going from a solids content of 35 to 47% by weight of the composition.

Preferably the solids content of the aqueous coating composition when determining the equilibrium viscosity is in the range of from 20 to 60%, more preferably in the range of from 20 to 65%, most preferably in the range of from 20 to 70%, especially in the range of from 20 to 75%.

In a preferred embodiment of the present invention said polyester oligomer(s) has a solution viscosity $\leqq 150$ Pa.s, as determined from a 80% by weight solids solution of the crosslinkable polyester oligomer(s) in at least one of the solvents selected from the group consisting of N-methylpyrrolidone, n-butylglycol and mixtures thereof, at a shear rate of $90\pm5$ s$^{-1}$ and at $50\pm2°$ C.

A choice of solvents for determining the solution viscosity of the polyester oligomer(s) is provided herein because the nature of the polyester oligomer(s) may affect their solubility.

Preferably the solution viscosity of the crosslinkable polyester oligomer(s) is $\leqq 100$ Pa.s, more especially $\leqq 50$ Pa.s and most especially $\leqq 20$ Pa.s when measured as defined above.

Alternatively, and more preferably, the solution viscosity of the polyester oligomer(s) may be measured at $23\pm2°$ C. and the crosslinkable polyester oligomer(s) may thus also be described as preferably having a solution viscosity $\leqq 250$ Pa.s, as determined from a 70% by weight solids solution of the crosslinkable polyester oligomer(s) in a solvent mixture consisting of:

i) at least one of the solvents selected from the group consisting of N-methylpyrrolidone, n-butylglycol and mixtures thereof;

ii) water and iii) N,N-dimethylethanolamine;

where i), ii) and iii) are in weight ratios of 20/7/3 respectively, using a shear rate of $90\pm5$ s$^{-1}$ and at $23\pm2°$ C.

Preferably in the preceding alternative the solution viscosity of the crosslinkable polyester oligomer(s) is $\leqq 100$ Pa.s, more especially $\leqq 50$ Pa.s and most especially $\leqq 20$ Pa.s when measured as defined herein at $23\pm2°$ C.

If a mixture of N-methylpyrrolidone (NMP) and n-butylglycol (BG) is used, preferably the ratio of NMP:BG is in the range of from 0.01:99.9 to 99.9:0.01, more preferably the ratio of NMP:BG is in the range of from 0.01:99.9 to 10:90 and in the range of from 90:10 to 99.9:0.01, and most preferably the ratio of NMP:BG is in the range of from 0.5:99.5 to 5:95 and in the range of from 95:5 to 99.5:0.5.

In a special embodiment of the present invention the wet edge time in minutes of the aqueous coating composition is at least Q/(wt. % solids of the aqueous coating composition)$^{0.5}$, wherein the solids content of the aqueous coating composition is between 15 and 70 wt. %, more preferably between 30 and 65 wt. % and most preferably between 40 and 60 wt. % and Q is a constant of 84, more preferably of 100, most preferably of 126 and especially of 151.

The crosslinkable polyester oligomer(s) may crosslink at ambient temperature by a number of mechanisms including but not limited to autoxidation, Schiff base crosslinking and silane condensation. By crosslinking by autoxidation is meant that crosslinking results from a oxidation occurring in the presence of air and usually involves a free radical mechanism and is preferably metal-catalysed resulting in covalent crosslinks. By Schiff base crosslinking is meant that crosslinking takes place by the reaction of a carbonyl functional group(s), where by a carbonyl functional group herein is mean an aldo or keto group and including an enolic carbonyl group such as is found in an acetoacetyl group, with a carbonyl-reactive amine and/or hydrazine (or blocked amine and/or blocked hydrazine) functional group. Examples of carbonyl-reactive amine (or blocked amine) functional groups include ones provided by the following compounds or groups: R—NH$_2$, R—O—NH$_2$, R—O—N=C<, R—NH—C(=O)—O—N=C< and R—NH—C(=O)—O—NH$_2$ where R is optionally substituted C$_1$ to C$_{15}$, preferably C$_1$ to C$_{10}$ alkylene, optionally substituted alicyclic or optionally substituted aryl, or R may also be part of a polymer. Examples of carbonyl-reactive hydrazine (or blocked hydrazine) compounds or groups include R—NH—NH$_2$, R—C(=O)—NH—NH$_2$, R—C(=O)—NH—N=C<, R—NH—C(=O)—NH—NH$_2$ and R—NH—C(=O)—NH—N=C< where R is as described above. By silane condensation is meant the reaction of alkoxy silane or —SiOH groups in the presence of water, to give siloxane bonds by the elimination of water and/or alkanols (for example methanol) during the drying of the aqueous coating composition.

Preferably the crosslinkable polyester oligomer(s) is a self-crosslinkable polyester oligomer(s) (i.e. crosslinkable without the requirement for added compounds which react with groups on the polyester oligomer(s) to achieve crosslinking, although these can still be employed if desired). Preferably the crosslinking is by autoxidation, optionally in combination with other crosslinking mechanisms as discussed herein. Suitably autoxidation is provided for example by fatty acid groups containing unsaturated bonds (by which is meant the residue of such fatty acids which have become incorporated into the polyester oligomer(s) by reaction with their carboxyl groups) or by (meth) allyl functional residues, β-keto ester groups or β-keto amide groups. Preferably autoxidation is provided at least by fatty acid groups containing unsaturated bonds.

Preferably the concentration of unsaturated fatty acid groups if present in the autoxidisably crosslinkable polyester oligomer(s) is 10 to 80%, more preferably 12 to 70%, most preferably 15 to 60% by weight based on the weight of the polyester oligomer(s). If combined with other autoxidisable groups in the aqueous coating composition, the fatty acid content may be below 10% by weight of the polyester oligomer(s). For the purpose of determining the fatty acid group content of the polyester oligomer(s), it is convenient for practical purposes to use the weight of the fatty acid reactant including the carbonyl group but excluding the hydroxyl group of the terminal acid group of the fatty acid. Suitable unsaturated fatty acids for providing fatty acid groups in the oligomer(s) include fatty acids derived from vegetable oil and non-vegetable oil such as soyabean oil, palm oil, linseed oil, tung oil, rapeseed oil, sunflower oil, tallow oil, (dehydrated) castor oil, safflower oil and fatty acids such as linoleic acid, linolenic acid, palmitoleic acid, oleic acid, eleostearic acid, licanic acid, arachidonic acid, ricinoleic acid, erucic acid, gadoleic acid, clupanadonic acid and/or combinations thereof. Particularly preferred is a polyester oligomer(s) in which the autoxidisable groups are only derived from unsaturated fatty acids. Preferably at least 40% by weight, more preferably at least 60% by weight, of the unsaturated fatty acid groups contain at least two unsaturated groups.

Other crosslinking mechanisms known in the art include the reaction of epoxy groups with amino, carboxylic acid or mercapto groups, the reaction of amine or mercapto groups with ethylenically unsaturated groups such as fumarate and acryloyl groups, the reaction of masked epoxy groups with amino or mercapto groups, the reaction of isothiocyanates with amines, alcohols or hydrazines, the reaction of amines (for example ethylene diamine or multifunctional amine terminated polyalkylene oxides) with -diketo (for example acetoacetoxy or acetoamide) groups to form enamines. The use of blocked crosslinking groups may be beneficial.

The crosslinkable polyester oligomer(s) may be completely water-soluble (which is less preferred) or only have partial solubility in water. If the crosslinkable polyester oligomer(s) is only partially soluble the crosslinkable polyester oligomer(s) preferably has low water solubility in a pH range of from 2 to 10 and is either self-water-dispersible (i.e. dispersible by virtue of a sufficient concentration of selected bound (in-chain, chain-pendant and/or chain-terminal) hydrophilic groups built into the crosslinkable polyester oligomer(s), and thus not requiring high shear techniques and/or added surfactants to produce the dispersion, although such methods can also be included if desired), or is only dispersible in water with the aid of added (i.e. external) surface active agents and/or use of high shear mixing. Low water solubility confers the advantage of a reduced water-sensitivity of the applied coating to water. Such low water solubility is defined herein as the crosslinkable polyester oligomer(s) being less than 80% by weight soluble in water throughout the pH range of from 2 to 10 as determined by a centrifuge test as described herein. Preferably the crosslinkable polyester oligomer(s) is ≦50% most preferably ≦30% by weight soluble in water throughout the pH range of from 2 to 10.

The crosslinkable polyester oligomer(s) preferably contains a sufficient concentration of bound hydrophilic water-dispersing groups capable of rendering the oligomer self water-dispersible, but the concentration of such groups is preferably not so great that the oligomer has an unacceptably high water solubility in order to not compromise the water sensitivity of the final coating.

The type of hydrophilic groups capable of rendering the crosslinkable polyester oligomer(s) water-dispersible are well known in the art, and can be ionic water-dispersing groups or non-ionic water-dispersing groups. Preferred non-ionic water-dispersing groups are polyalkylene oxide groups, more preferably polyethylene oxide groups. A small segment of the polyethylene oxide group can be replaced by propylene oxide segment(s) and/or butylene oxide segment(s), however the polyethylene oxide group should still contain ethylene oxide as a major component. When the water-dispersible group is polyethylene oxide, the preferred ethylene oxide chain length is >4 ethylene oxide units, preferably >8 ethylene oxide units and most preferably >15 ethylene oxide units. Preferably the polyester oligomer(s) have a polyethylene oxide content of 0 to 50% by weight, more preferably 0 to 45% by weight, still more preferably 0 to 38% by weight, especially 3 to 35% by weight and most preferably 5 to 25% by weight. Preferably the polyethylene oxide group has a Mw from 175 to 5000 Daltons, more preferably from 350 to 2200 Daltons, most preferably from 660 to 2200 Daltons.

Preferred ionic water-dispersing groups are anionic water-dispersing groups, especially carboxylic, phosphonic and or sulphonic acid groups. The anionic water-dispersing groups are preferably fully or partially in the form of a salt. Conversion to the salt form is optionally effected by neutralisation of the crosslinkable polyester oligomer(s) with a base, preferably during the preparation of the crosslinkable polyester oligomer(s) and/or during the preparation of the composition of the present invention. The anionic dispersing groups may in some cases be provided by the use of a monomer having an already neutralised acid group in the polyester oligomer(s) synthesis so that subsequent neutralisation is unnecessary. If anionic water-dispersing groups are used in combination with a non-ionic water-dispersing group, neutralisation may not be required.

If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4OH^-$, can also be used. Generally a base is used which gives the required counter ion desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and or quaternary ammonium groups which may be neutralised or permanently ionised (for example with dimethylsulphate).

The crosslinkable polyester oligomer(s) preferably has a weight average molecular weight (Mw) in the range of from 1000 to 100,000 Daltons, preferably in the range of from 1000 to 80,000 Daltons, more preferably in the range of from 1000 to 50,000 Daltons, most preferably in the range of from 1000 to 20,000 Daltons. For the purpose of this invention any molecular species mentioned herein with a Mw <1000 Daltons is classified as either a reactive diluent or a plasticiser and is therefore not taken into account for the determination of the Mw, Mn and PDi. When Daltons are used to give molecular weight data, it should be understood that this is not a true molecular weight but a molecular weight measured against polystyrene standards.

Preferably a significant part of any crosslinking reaction only takes place after application of the aqueous coating composition to a substrate, to avoid an excessive molecular weight build up which may lead to an increased viscosity of the aqueous coating composition on the substrate in the early stages of drying.

The molecular weight limits suitable to obtain the preferred low solution viscosity of the crosslinkable polyester oligomer(s) as defined above may depend in part on the amount and type of co-solvent present in the aqueous composition of the invention, where a higher molecular weight limit is possible when there is more co-solvent in the composition, and the lower molecular weight preferences are more applicable to low or zero co-solvent concentrations.

The molecular weight distribution (MWD) of the crosslinkable polyester oligomer(s) has an influence on the equilibrium viscosity of the aqueous composition of the invention and hence an influence on the open time. MWD is conventionally described by the polydispersity index (PDi). PDi is defined as the weight average molecular weight divided by the number average molecular weight (Mw/Mn) where lower values are equivalent to lower PDi's. It has been found that a lower PDi often results in lower viscosities for a given Mw crosslinkable polyester oligomer(s). Preferably the value of PDi is $\leq 30$, more preferably $\leq 15$, still more preferably $\leq 10$ and most preferably $\leq 5$. In a preferred embodiment the value of Mw×Pdi$^{0.8}$ of the crosslinkable polyester oligomer(s) is $\leq 550,000$, more preferably the Mw×PDi$^{0.8}$ is $\leq 400,000$, still more preferably the Mw×PDi$^{0.8}$ is $\leq 300,000$ and most preferably the Mw×PDi$^{0.8}$ is $\leq 220,000$.

The crosslinkable polyester oligomer(s) may comprise a single crosslinkable polyester oligomer(s) or a mixture of polyester oligomer(s). The crosslinkable polyester oligomer(s) may optionally be used in conjunction with crosslinkable oligomer(s) of a non-polyester type which has a solution viscosity within the same preferred limits as the solution viscosity of the polyester oligomer(s). Indeed up to 90% by weight of crosslinkable oligomers in the invention composition may be of a non-polyester type. The crosslinkable oligomer(s) (polyester type plus, if present, non-polyester type) may optionally be used in conjunction with up to 250% by weight thereof of any type of non-crosslinkable oligomer (i.e. polyester and/or non-polyester type) provided that the non-crosslinkable oligomer(s) has a solution viscosity within the preferred ranges defined above (for the crosslinkable polyester oligomer(s)). In such cases, more preferably up to 120 wt. % of the non-crosslinkable oligomer(s) (based on the weight of crosslinkable oligomer(s) is used, still more preferably up to 70 wt. %, especially up to 30 wt. %, more especially up to 10 wt. %, and most preferably 0%. Oligomer(s) of a non polyester type include but are not limited to for example vinyl oligomer(s), polyamide oligomer(s), polyether oligomer(s), polycarbonate oligomer(s), polysiloxane oligomer(s) and/or polyurethane oligomer(s) and the non-polyester type oligomer(s) may optionally be branched.

The crosslinkable polyester oligomer(s) can be prepared using conventional polymerisation procedures known to be effective for polyester synthesis. General processes for the preparation of alkyd polyesters are described in "Alkyd Resin Technology" by T C Patton, Publisher John Wiley & sons Inc. (1962). General methods for preparing crosslinkable polyesters are also disclosed in EP 486092, U.S. Pat. Nos. 3,494,882, 4,251,406, EP 0000087, WO 95/02019, U.S. Pat. No. 5,378,757 and GB 2306489. Thus, it is well known that polyesters, which contain carbonyloxy (i.e. —C(=O)—O—) linking groups may be prepared by a condensation polymerisation process in which monomer(s) providing an "acid component" (including ester-forming derivatives thereof) is reacted with monomer(s) providing a "hydroxyl component". The monomer(s) providing an acid component may be is selected from one or more polybasic carboxylic acids such as di- or tri-carboxylic acids or ester-forming derivatives thereof such as acid halides, anhydrides or esters. The monomer(s) providing a hydroxyl component may be one or more polyhydric alcohols or phenols (polyols) such as diols, triols, etc. Mono-functional acid and hydroxy components may also be included in the preparation of the crosslinkable polyester oligomer(s). (It is to be understood, however, that the polyester oligomer(s) may contain, if desired, a proportion of carbonylamino linking groups —C(=O)—NH— (i.e. amide linking group) by including an appropriate amino functional reactant as part of the "hydroxyl component" or alternatively all of the hydroxyl component may comprise amino functional reactants, thus resulting in a polyamide oligomer; such amide linkages are in fact useful in that they are more hydrolysis resistant.) The reaction to form a polyester oligomer(s) may be conducted in one or more stages (as is well known). It would also be possible to introduce in-chain unsaturation into the polyester oligomer(s) by e.g. employing as part of the monomer(s) providing an acid component an olefinically unsaturated dicarboxylic acid or anhydride.

There are many examples of carboxylic acids (or their ester forming derivatives) which can be used in polyester oligomer(s) synthesis for the provision of the monomer(s) providing an acid component. Examples include, but are not limited to monofunctional acids such as (alkylated) benzoic acid and hexanoic acid; and $C_4$ to $C_{20}$ aliphatic, alicyclic and aromatic dicarboxylic acids (or higher functionality acids) or their ester-forming derivatives (such as anhydrides, acid chlorides, or lower alkyl esters). Specific examples include adipic acid, fumaric acid, maleic acid, succinic acid, itaconic acid, azeleic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, fatty acid dimers, isophthalic acid, 5-sodiosulpho isophthalic acid, phthalic acid and tetrahydrophthalic acid. Anhydrides include succinic, maleic, phthalic, trimellitic and hexahydrophthalic anhydrides.

Similarly there are many examples of polyols which may be used in polyester oligomer(s) synthesis for the provision of the monomer(s) providing a hydroxyl component. The polyol(s) preferably have from 1 to 6 (more preferably 2 to 4) hydroxyl groups per molecule. Suitable monofunctional alcohols include for example eicosanol and lauryl alcohol. Suitable polyols with two hydroxy groups per molecule include diols such as 1,2-ethanediol, 1,3-propanediol, 1,4-butanediol, 1,6-hexanediol, 2,2-dimethyl-1,3-propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols with three hydroxy groups per molecule include triols such as trimethylolpropane (TMP) and 1,1,1-tris (hydroxymethyl)ethane (TME). Suitable polyols with four or more hydroxy groups per molecule include bis-TMP, pentaerythritol (2,2-bis(hydroxymethyl)-1,3-propanediol), bis-pentaerythritol and sorbitol (1,2,3,4,5,6-hexahydroxyhexane).

The crosslinker groups may be introduced into the polyester oligomer(s) using two general methods: i) by utilising in the polymerisation process to form a polyester oligomer(s) monomer(s) providing at least part of the acid or hydroxyl components which carry a crosslinker group; or ii) utilising monomer(s) providing at least part of the acid or hydroxyl components which bears selected reactive groups and which monomer(s) is subsequently reacted with a compound carrying a crosslinker group and also a reactive group of the type which will react with the selected reactive groups on the monomer to provide attachment of the crosslinker group to the polyester oligomer(s) via covalent bonding.

To prepare autoxidisably crosslinkable polyester oligomer(s) preferably a monomer providing an acid or a hydroxyl component bearing an unsaturated fatty acid group(s) as crosslinker group(s) may be used in the polyester oligomer(s) synthesis.

Hydrophilic water-dispersing groups (or groups which may be subsequently converted to such water-dispersing groups) are optionally introduced into the polyester oligomer(s) using two general methods: i) by utilising in the polymerisation process to form a polyester oligomer(s)

monomer(s) providing part of the acid or hydroxyl component which carry a hydrophilic water-dispersing group; or ii) utilising monomer(s) providing part of the acid or a hydroxyl component which bears selected reactive groups and which monomer is subsequently reacted with a compound carrying a hydrophilic water-dispersing group and also a reactive group of the type which will react with the selected reactive groups on the monomer to provide attachment of the hydrophilic water-dispersing group to the polyester oligomer(s) via covalent bonding.

The hydrophilic water-dispersing groups if present, should be present in sufficient level in the polyester oligomer(s) to impart water-dispersibility thereto. Suitable non-ionic hydrophilic water dispersing groups include for example ethylene oxide-containing hydroxy functional compounds such as alkoxypolyethlene glycols and polyethylene glycols. Preferably the hydrophilic water-dispersing groups are carboxylic acid groups, sulphonic acid groups or sulphonate anion groups (neutralisation of the sulphonic acid groups preferably already having been effected in the monomer). Preferably incorporation of carboxylic acid groups can occur by having a residual carboxylic acid functionality, post functionalisation of hydroxy-functionalised polyester oligomer(s) or use of sterically hindered hydroxy functional acids such as dimethylolpropionic acid. Preferably, the sulphonic acid or sulphonate anion containing monomer is a dicarboxylic acid monomer having at least one sulphonic acid salt group substituent. Alternatively, alkyl ester groups may be used in place of the carboxylic acid groups. Such a monomer will therefore be part of the acid component used in the polyester synthesis. Examples of such compounds are the alkali metal salts of sulphonic acid substituted aromatic dicarboxylic acids, for example alkali metal salts of 5-sulpho-1,3-benzene dicarboxylic acid. Particularly preferred is sodio-5-sulphoisophthalic acid (SSIPA). Other useful sulphonic acid containing monomers are the alkali metal salts of sulphonic acid substituted aromatic dicarboxylic acid-dihydroxyalkylesters such as the alkali metal salts of 5-sulpho-1,3-benzenedicarboxylic acid-1,3-bis(2-hydroxyethyl) ester.

Preferably the ionic sulphonate water-dispersing group content of the polyester oligomer(s) is in the range of from 7.5 to 100 milliequivalents of ionic water-dispersing groups per 100 g of polyester oligomer(s), more preferably from 10 to 75 milliequivalents per 100 g. Preferably the acid value of the polyester oligomer(s) is in the range of from 0 to 150 mgKOH/g, more preferably in the range of from 0 to 120 mgKOH/g, especially in the range of from 5 to 90 mgKOH/g, more especially in the range of from 10 to 60 mgKOH/g and most especially in the range of from 10 to 40 mgKOH/g.

If the polyester oligomer(s) is prepared using monomer(s) providing acid or hydroxyl component which have an unsaturated group(s), the polyester oligomer(s) will have unsaturation incorporated into its structure, and can if desired be subjected to a further stage of polymerisation by a free radical mechanism, to cause chain-extension of the polyester and such a reaction would usually take place in an aqueous dispersion phase, rather than in the melt as when conducting the esterification polymerisation process. Alternatively the unsaturated group in the polyester oligomer(s) may be utilised to provide further functional groups, for example by reaction with an aminosilane, whereby the amino groups add to the double bonds via a Michael addition reaction, so as to introduce alkoxy silane functionality of the polyester oligomer(s). Any residual unsaturation may also be utilised for reaction with any fatty acid unsaturation.

Suitable monomers providing an acid component and an unsaturated group include but are not limited to fumaric acid, maleic acid, maleic anhydride and hydroxyalkyl(meth) acrylates, for example hydroxyethylmethacrylate.

The esterification polymerisation processes for making the polyester oligomer(s) for use in the invention composition are well known in the art and need not be described here in detail. Suffice to say that they are normally carried out in the melt using catalysts such as tin-based catalysts and with the provision for removing any water (or alcohol) formed from the condensation reaction.

An organic solvent may optionally be added before or after the polymerisation process to control the viscosity. Examples of solvents include water-miscible solvents such as N-methylpyrrolidone, glycol ethers such as butyldiglycol, diglyme and alkyl ethers of glycol acetates or mixtures of N-methylpyrrolidone and methyl ethyl ketone. Optionally no organic solvents are added.

The polyester oligomer(s) may be dispersed in water using techniques well known in the art. An aqueous dispersion of the polyester oligomer(s) may be readily prepared by adding water directly to the hot polyester oligomer(s) melt until the desired solids content/viscosity is reached. Alternatively the polyester oligomer(s) may be dispersed in water by adding an aqueous pre-dispersion (or organic solvent solution) of the polyester oligomer(s) to the water phase. Still further an aqueous dispersion may be prepared by dispersion of the solidified melt from the condensation polymerisation directly into water. The solidified melt is preferably in a form such as flake (which can often be obtained directly from the melt) or comminuted solid (obtained for example by grinding).

The polyester oligomer(s) normally do not require the use of an external surfactant when being dispersed into water, although surfactants and or high shear can be utilised in order to assist in the dispersion of the polyester oligomer(s) in water (even if it is self-dispersible). Suitable surfactants include but are not limited to conventional anionic, cationic and/or non-ionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount used is preferably 0 to 15% by weight, more preferably 0 to 8% by weight, still more preferably 0 to 5% by weight, especially 0.1 to 3% by weight and most especially 0.3 to 2% by weight based on the weight of the crosslinkable polyester oligomer(s).

The aqueous dispersion of the polyester oligomer(s) may be for example, a colloidal dispersion of the polyester oligomer(s) in water (i.e. an emulsion or latex) or a solution (molecular dispersion) of the polyester oligomer(s) in water, or a combination thereof.

The glass transition temperature (Tg) of the polyester oligomer(s) may vary within a wide range. The Tg (as measured by modulated differential scanning calorimetry) is preferably in the range of from −90 to 100° C., more preferably −90 to 50° C. especially −75 to 30° C. and most preferably −60 to 10° C.

The aqueous composition of the invention may optionally but preferably include a polymer dispersed therein which is not a polyester oligomer (or a non-polyester oligomer whether crosslinkable or non-crosslinkable) and has a Mw≧120,000 Daltons, (herein termed a dispersed polymer for convenience). Preferably the weight average molecular weight of the dispersed polymer(s) in the aqueous polymer dispersion is in the range of from 120,000 to 6,000,000, more preferably in the range of from 150,000 to 2,000,000, and especially in the range of from 250,000 to 1,500,000. If the dispersed polymer(s) is fully pre-crosslinked its Mw will be infinite. Also, in some cases, the synthesis to form the crosslinkable polyester oligomer(s) yields, in addition to the polyester oligomer(s), an amount of very high molecular material. For the purposes of this invention, such material, produced in-situ, is to be considered as a dispersed polymer. The Mw of the dispersed polymer(s) may be <120,000 Daltons with the proviso that the solution viscosity of the dispersed polymer(s) is >150 Pa.s as determined from a 80% by weight solids solution of the dispersed polymer(s) in at least one of the solvents selected from the group consisting of N-methyl pyrrolidone, n-butyl glycol and mixtures thereof using a shear rate of 90±5 s$^{-1}$ and at 50±2° C.

Preferably the solution viscosity (if measurable) of the dispersed polymer(s) when used in the aqueous composition of the invention is ≧250 Pa.s more preferably ≧500 Pa.s and especially ≧1000 Pa.s, as determined from an 80% by weight solids solution of the dispersed polymer(s) in at least one of the solvents selected from the group consisting of N-methylpyrrolidone, n-butylglycol and mixtures thereof, using a shear rate of 90±5 s$^{-1}$ and at 50±2° C.

The solution viscosity of the dispersed polymer(s) may not be measurable if for example the weight average molecular weight is so high, so as to render the dispersed polymer(s) insoluble or if the dispersed polymer(s) is fully or partially crosslinked, again rendering the dispersed polymer(s) insoluble.

The dispersed polymer(s) may be film forming or non-film forming at ambient temperature, preferably the dispersed polymer(s) is non-film forming at ambient temperature (ambient temperature as used herein is defined as 23±2° C). Preferably the aqueous composition of the invention does include such a dispersed polymer(s).

The crosslinkable polyester oligomer(s) can thus be (and preferably is) combined with a dispersed polymer(s) to further improve the provision of a binder system for providing an aqueous composition with the desired balance of long open/wet edge time and reduced tack free time.

The presence of the crosslinkable polyester oligomer(s) (as discussed above) provides the defined long open time and wet edge time, whilst the presence of the dispersed polymer(s) (e.g. a polymer latex) appears to assist in reducing the drying time of the composition, even though its presence may not be essential to achieve the defined requirements in this respect.

Accordingly in a further, and preferred, embodiment of the present invention there is provided an aqueous coating composition as defined herein additionally comprising a dispersed polymer(s). The dispersed polymer(s) may for example be the product of an aqueous emulsion polymerisation or a preformed polymer dispersed in water.

Preferably the dispersed polymer(s) has a Tg measured using DSC, which is in the range of from −50 to 300° C., more preferably in the range of from 25 to 200° C. and most preferably in the range of from 35 to 125° C. If the dispersed polymer(s) is a vinyl polymer, the vinyl polymer may be a sequential polymer, i.e. the vinyl polymer will have more than one Tg. Especially preferred is a vinyl polymer with 10 to 50 wt. % of a soft part with a Tg in the range of from −30 to 20° C. and 50 to 90 wt. % of a hard part of with a Tg in the range of from 60 to 110° C. This combination provides an additional advantage of improved block resistance of the resultant coating, especially when co-solvent levels of 0 to 15 wt. %, more preferably 0 to 5 wt. % and most preferably 0 to 3 wt. %. of the aqueous composition are used. A simple blend of dispersed polymers with high and low Tg's may also be used to achieve the same or similar advantage. Blocking is the well-known phenomenon of coated substrates which are in contact tending to unacceptably adhere to each other, particularly when under pressure, as for example in doors and windows in their respective frames or when stacked.

Preferably the dispersed polymer(s) has an average particle size in the range of from 25 to 1000 nm, more preferably 60 to 700 nm, most preferably 100 to 600 nm and especially in the range of from 175 to 500 nm. The dispersed polymer may also have a polymodal particle size distribution.

The dispersed polymer(s) preferably has a low solubility in the aqueous medium of the composition of the invention, however some of the dispersed polymer(s) may be soluble measurable by the centrifuge test as described herein. Preferably at least 30%, more preferably at least 60%, most preferably at least 90% and especially at least 94% by weight of the dispersed polymer(s) is present as insoluble polymer over the whole pH range.

The dispersed polymer(s) may for example be vinyl polymer, polyester, polyamide, polyepoxide, or a mixture thereof. The dispersed polymer(s) may also be a hybrid of two or more different polymer types such as urethane-acrylic polymers (as described in for example U.S. Pat. No.5,137,961), epoxy-acrylic polymers and polyester-acrylic polymers. The dispersed polymer(s) may also be an organic-inorganic hybrid, for example silica particles grafted with a vinyl polymer(s). Preferably the dispersed polymer(s) is a vinyl polymer. Blends of dispersed polymers may of course also be used.

The dispersed polymer(s) may optionally contain carboxylic acid groups. The dispersed polymer(s) preferably has an acid value below 150 mgKOH/g, more preferably an acid value in the range from 3 to 120 mg/KOH/g, most preferably an acid value in the range from 4 to 180 mg KOH/g, especially an acid value in the range from 5 to 30 mg KOH/g and most especially an acid value in the range from 6 to 19 mgKOH/g. The preferred acid value of the dispersed polymer(s) depend on the nature of the crosslinkable polyester oligomer(s) and the amount of co-solvent in the aqueous composition of the invention. If the oligomer is hydrophilic, the co-solvent if used is preferably also of a hydrophilic nature and a low acid value of the dispersed polymer(s) is preferred (preferably below 60, more preferably below 40, most preferably below 24, and especially below 15 mg KOH/g). If however a hydrophobic oligomer is used, for instance based on (at least partly) unsaturated fatty acid and without dispersing groups, the cosolvent is preferentially of a hydrophobic nature (if at all present) and therefore much higher acid values (up to an acid value of 160, more preferred up to 125, most preferred up to 100 mg KOH/g) of the dispersed polymer(s) may be tolerated to give the desired properties.

In a special embodiment, ≦15 wt. % of a co-solvent (based on total binder solids where the binder includes the oligomer(s) and any dispersed polymer(s)) is used, where the dispersed polymer(s) has an acid value below 20 mg KOH/g and the crosslinkable polyester oligomer(s) is present in an amount (based on total binder polymer solids) of 35 to 65 wt. %, the crosslinkable polyester oligomer comprising 45 to 70 wt. % of fatty acid groups.

The dispersed polymer(s) may optionally contain hydroxyl groups. If the dispersed polymer(s) is a vinyl polymer comprising polymerised (meth)acrylic monomers then preferably the hydroxyl group content in the vinyl polymer is preferably below 1.0 wt. %, more preferably below 0.5 wt. % and most preferably below 0.2 wt. % based on the weight of the vinyl polymer.

The dispersed polymer(s) may optionally contain amide groups (such as groups being for example obtainable from amide functional monomers such as (meth)acrylamide).

If the dispersed polymer(s) is a vinyl polymer comprising polymerised (meth)acrylamide monomers, then preferably the amide group content in the vinyl polymer is below 3.0 wt. %, more preferably below 1.5 wt. % and most preferably below 0.6 wt. % based on the weight of the vinyl polymer.

The dispersed polymer(s) may optionally contain wet-adhesion promoting groups such as acetoacetoxy groups; (optionally substituted) amine or urea groups, for example cyclic ureido groups, imidazole groups, pyridine groups, hydrazide or semicarbazide groups.

The dispersed polymer(s) may optionally contain crosslinker groups which allow crosslinking of the dispersed polymer(s) and/or allow participation in the crosslinking reaction of the crosslinkable polyester oligomer(s), thus speeding up the drying rate and improving the properties of the final coating (e.g. chemical resistance and scratch resistance). Examples of such crosslinker groups include groups which can take part in the autoxidation and groups which will effect crosslinking other than by autoxidation, for example, Schiff base and silane condensation reactions as discussed above for polyester oligomer(s).

In a preferred embodiment the dispersed polymer(s) contains crosslinker groups which can participate in the preferred autoxidative crosslinking reactions of an autoxidisably crosslinkable polyester oligomer(s).

In a preferred embodiment the dispersed polymer(s) may be partially or fully pre-crosslinked. If the dispersed polymer(s) is a vinyl polymer pre-crosslinking may be achieved by using polyunsaturated monomers during the vinyl polymer synthesis such as allyl methacrylate, diallyl phthalate, tripropylene glycol di(meth)acrylate, 1,4-butanediol diacrylate and trimethylol propane triacrylate (TMPTA). Allyl methacrylate is most preferred. Alternatively very low levels of initiator may be used, leading to chain-transfer to the vinyl polymer and hence to grafting and high Mw. Other ways to generate pre-crosslinking in a vinyl polymer is to include the use of monomer(s) bearing groups which may react with each other during synthesis to effect pre-crosslinking for example glycidylmethacrylate and acrylic acid.

Vinyl polymer(s) are derived from free radically polymerisable olefinically unsaturated monomers (vinyl monomers) and can contain polymerised units of a wide range of such vinyl monomers, especially those commonly used to make binders for the coatings industry.

Examples of vinyl monomers which may be used to form vinyl polymer(s) include but are not limited to 1,3-butadiene, isoprene, styrene, ic-methyl styrene, divinyl benzene, acrylonitrile, methacrylonitrile, vinyl halides such as vinyl chloride, vinylidene halides such as vinylidene chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

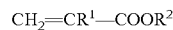

$$CH_2=CR^1-COOR^2$$

wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Olefinically unsaturated monocarboxylic, sulphonic and/or dicarboxylic acids, such as acrylic acid, methacrylic acid, P-carboxy ethyl acrylate, fumaric acid, itaconic acid, sodio-4-sulpho-styrene (SSS), acrylamidopropane sulphonic acid (AMPS), (meth)acrylamide, methoxypolyethyleneoxide (meth)acrylate may also be used.

The vinyl monomer may optionally contain functional groups to contribute to the crosslinking of the vinyl polymer(s) in the coating. Examples of such groups include maleic, epoxy, fumaric, acetoacetoxy, p-diketone, unsaturated fatty acid, acryloyl, methacryloyl, styrenic, (meth)allyl groups, mercapto groups, keto or aldehyde groups (such as methylvinylketone, diacetoneacrylamide and (meth)acrolein).

Particularly preferred are vinyl polymer(s) made from a monomer system comprising at least 40 weight % of one or more monomers of the formula $CH_2=CR^1COOR^2$ defined above. Such preferred vinyl polymer(s) are defined herein as acrylic polymer(s). More preferably, the monomer system contains at least 50 weight % of such monomers, and particularly at least 60 weight %. The other monomers in such acrylic polymer(s) (if used) may include one or more of the other vinyl monomers mentioned above, and/or may include ones different to such other monomers. Particularly preferred monomers include butyl acrylate, butyl methacrylate, methyl methacrylate, ethyl hexyl methacrylate, esters of (meth)acrylic acid, vinyl and vinylidene chloride, butadiene, acrylonitrile, vinyl acetate and styrene.

If the dispersed polymer(s) is a dispersed vinyl polymer, the dispersed vinyl polymer optionally comprises at least 15 wt. %, more preferably at least 40 wt. % and most preferably at least 60 wt. % of polymerised vinyl acetate. If the dispersed vinyl polymer comprises at least 50 wt. % of polymerised vinylacetate then preferably the dispersed vinyl polymer also comprises 10 to 49 wt. % of either butylacrylate or a branched vinylester, for example Veova 10.

In a preferred embodiment the dispersed vinyl polymer comprises:

I. 15 to 60 wt. % of styrene and/or (x-methylstyrene;
II. 15 to 80 wt. % of one or more of methyl methacrylate, ethyl methacrylate, cyclohexyl (meth)acrylate and n-butyl methacrylate;

III. 0 to 5 wt. % of vinyl monomer containing carboxylic acid groups;

IV. 0 to 10 wt. %, more preferably 0 to 5 wt. % of a vinyl monomer containing non-ionic water-dispersing groups;

V. 5 to 40 wt. % of vinyl monomers other than as in I to IV, VI and VII;

VI. 0 to 5 wt. % of vinyl monomers containing wet adhesion promoters or crosslinker groups (excluding any within the scope of III and VII); and VII. 0 to 8 wt. %, more preferably 0 to 4 wt. %, and most preferably 0.5 to 3 wt. % of a polyethylenically unsaturated vinyl monomer, wherein I)+II) add up to at least 50 wt. % and I+II+III+IV+V+VI+VII add up to 100%.

The dispersed polymer(s) can be prepared by any known technique. Preparation techniques include either dispersing a pre-formed polymer or polymer solution in water or if the dispersed polymer(s) is a vinyl polymer directly synthesising the vinyl polymer in water (for example by emulsion polymerisation, micro-suspension polymerisation or mini emulsion polymerisation). Methods for preparing aqueous dispersed polymer(s) are reviewed in the Journal of Coating Technology, volume 66, number 839, pages 89–105 (1995) and these methods are included herein by reference. Preferably dispersed vinyl polymer(s) are prepared by the emulsion polymerisation of free radically polymerisable olefinically unsaturated monomers (Emulsion Polymerisation and Emulsion Polymers, P. Lovell, M. S. El-Aasser, John Wiley, 1997). Any published variant of the emulsion polymerisation process may be utilised to prepare the dispersed polymer(s), including the use of seeded emulsion polymerisation techniques to control particle size and particle size distribution, especially when working in the particle size range 300–700 nm when the seeded technique is useful for giving good particle size control. Other useful techniques are the so called sequential polymerisation technique and the power feed technique (chapter 23 in "Emulsion Polymers and Emulsion Polymerisation" D R Basset and A E Hamielec, ACS Symposium Series No 165,1981).

Preferably the dispersed polymer(s) is colloid stable and it is also desirable that colloid stability is maintained for as long as possible into the drying process since early loss of colloid stability can bring a premature end to open time. Since the final coating composition may often contain co-solvents and dissolved ionic species (e.g. from pigment dissolution and from the presence of neutralising agents), it is desirable that the colloid stability of the dispersed polymer(s) is adequate to withstand any destabilising influences of these components. Colloid stability may be achieved by the addition of conventional non-ionic surfactants, optionally with the addition of anionic surfactants at any stage during the preparation of the aqueous composition of the invention. Strongly adsorbing surfactants capable of providing steric stability are preferred. Higher levels of colloid stability may be obtained by chemically binding or partially binding hydrophilic stabilising groups such as polyethylene oxide groups to the surface of dispersed polymer(s) particles. Suitable surfactants and stabilising groups are described in "Non Ionic Surfactants-Physical Chemistry" (see for example M J Schick, M Dekker Inc 1987) and "Polymer Colloids" (Buscall, Corner & Stageman, Elsevier Applied Science Publishers 1985).

Chemical binding (grafting) of hydrophilic stabilising groups onto dispersed polymer(s) particles can be achieved by the use of a comonomer, polymerisation initiator and/or chain transfer agent bearing the stabilising group, for example methoxy(polyethylene oxide)$_{30}$ methacrylate may be introduced as a comonomer into an emulsion polymerisation to give rise to stabilised dispersed polymer particles with bound polyethylene oxide groups on the particle surface. Another method of producing a strongly sterically stabilised dispersed polymer(s) is to introduce cellulosic derivatives (e.g. hydroxy ethyl cellulose) during an emulsion polymerisation (see for example D H Craig, Journal of Coatings Technology 61, no.779, 48, 1989). Hydrophilic stabilising groups may also be introduced into a preformed polymer before it is subsequently dispersed in water, as described in EP 0317258 where polyethylene oxide groups are reacted into a polyester polymer which is subsequently dispersed in water and then chain extended.

The combination of crosslinkable polyester oligomer(s) (and other crosslinkable or non-crosslinkable oligomers if used) and dispersed polymer(s) is most conveniently prepared by physically blending the corresponding aqueous dispersions. However other methods of preparing the combination can sometimes be utilised. One such method is to prepare the crosslinkable polyester oligomer(s) in solution as previously discussed, and to disperse this solution directly into a dispersed polymer(s). Alternatively the solvent can be removed from the crosslinkable polyester oligomer(s) solution, and the polyester oligomer(s) is directly dispersed into a dispersed polymer(s). Another method is to introduce the crosslinkable polyester oligomer(s) into an aqueous free radical polymerisation reaction which produces the dispersed polymer(s). Such an introduction of polyester oligomer(s) can either be at the commencement of the aqueous free radical polymerisation or during an aqueous free radical polymerisation. (Also as mentioned previously, a dispersed polymer can sometimes be formed in-situ from the synthesis of a polyester oligomer(s) as a very high molecular weight polymer fraction resulting from the polyester synthesis).

The crosslinkable polyester oligomer(s) may also be diluted with reactive diluent (for example vinyl monomers) at any stage of its preparation and then dispersed into a dispersed polymer(s), followed by polymerisation of the reactive diluent in the presence of the polyester oligomer(s) and the optional polymer dispersion(s). Optionally, depending on the nature of the reactive diluent, no further polymerisation of the reactive diluent prior to use in a coating may be required.

Alternatively the crosslinkable polyester oligomer(s) and dispersed polymer(s) may be combined by preparing a redispersible dry powder form of the dispersed polymer(s), and then dispersing the redispersible dry powder directly into an aqueous dispersion of the crosslinkable polyester oligomer(s). Methods for preparing redispersible dry powders from polymer emulsions are described for example in U.S. Pat. No.5,962,554, DE 3323804 and EP 0398576.

In an embodiment of the invention the crosslinkable polyester oligomer(s) and the optional dispersed polymer(s) are compatible in the drying aqueous composition. Preferably the crosslinkable polyester oligomer(s) and the dispersed polymer(s) give clear films upon film formation after coating of the aqueous composition onto a substrate.

Preferably the ratios by weight of solid material of crosslinkable polyester oligomer(s) (and other crosslinkable or non-crosslinkable oligomers if used) to the dispersed polymer(s) in the range of from 100:0 to 10:90, more preferably in the range of from 90:10 to 20:80, still more preferably in the range of from 80:20 to 25:75 and especially in the range of 60:40 to 30:70.

The aqueous coating composition of the invention is particularly useful as or for providing the principle component of coating formulations (i.e. composition intended for application to a substrate without any further treatment or additions thereto) such as protective or decorative coating compositions (for example paint, lacquer or varnish) wherein an initially prepared composition may be optionally further diluted with water and/or organic solvents and/or combined with further ingredients, or may be in more concentrated form by optional evaporation of water and/or organic components of the liquid medium of an initially prepared composition. The invention composition can contain co-solvent or a mixture of co-solvents. Preferably the invention composition contains ±18% by weight of cosolvent(s), more preferably ±10%, still more preferably ±5%, especially ±3% and most especially 0% by weight based on the invention composition. Preferably the evaporation rate of the co-solvent is $\leq 0.6$, more preferably $\leq 0.15$ most preferably $\leq 0.08$, and especially $\leq 0.035$. Values for evaporation rates were published by Texaco Chemical Company in a bulletin Solvent Data: Solvent Properties 1990. These values are relative to the evaporation rate of n-butylacetate for which the evaporation rate is defined as 1.00. Determinaton of the evaporation rate of solvents that are not listed in this bulletin is as described in ASTM D3539.

In a special embodiment, the amount of co-solvent used in the invention composition is preferably linked to the Mw in the range 1,000 to 120,000 Daltons, the amount of co-solvent is preferably 0 to 15 wt. % based on the weight of the composition, more preferably 0 to 10 wt. %. For oligomers with Mw in the range >50,000 to 100,000 Daltons, the corresponding figures for the preferred amount of co-solvent are 0 to 25 wt. %, more preferably 5 to 20 wt. %.

Furthermore, there is also a preferred relationship between the amount of co-solvent used and the amount of binder polymer solids, and the amount of co-solvent is preferably $\leq 50$ wt. % based on the weight of binder polymer solids in the composition, more preferably $\leq 35$ wt. %, still more preferably $\leq 20$ wt. %, most preferably $\leq 10$ wt. % and especially 0 wt. %.

An advantage of the current invention is that co-solvent can, if as is often required for environmental and safety reasons, be present at a very low concentrations because of the plasticising nature of the crosslinkable polyester oligomer(s). Preferably the solvent to water ratio is below 1.0, more preferably below 0.5, most preferably below 0.3 and especially below 0.15. The co-solvent(s) can all be added at the final formulation step. Alternatively some or all of the co-solvent in the final formulation can be the co-solvent utilised in the preparation of the crosslinkable polyester oligomer. An important consideration when choosing a co-solvent is whether or not the co-solvent is compatible with the crosslinkable polyester oligomer(s) and/or the dispersed polymer(s) and the effect of any co-solvent partitioning (and the partitioning of the co-solvent in the (aqueous) polyester oligomer phase versus the dispersed polymer particles is preferably >1/1, more preferably >2/1 and most preferably >3/1). If the co-solvent is more compatible with the polymer it will swell the polymer, thus increasing the overall viscosity. Preferably any co-solvent present in the aqueous composition of the invention is more compatible with the polyester oligomer(s) then with the dispersed polymer(s), so that the dispersed polymer(s) undergoes little if any swelling by the co-solvent. The co-solvent selection is often determined by experimentation and/or by the use of a solubility parameter concept i.e. maximising the difference in the solubility parameter of the dispersed polymer(s) and solvent leads to a minimisation of the co-solvent uptake by the dispersed polymer(s). Solubility parameters of a range of solvents and a group contribution method for assessing the solubility parameters of polymers are given by E A Grulke in the "Polymer Handbook" (John Wiley pages 519–559, 1989) and by D W Van Krevelen and P J Hoftyzer in "Properties of Polymers. Correlations With Chemical Structure" (Elsevier, N.Y., 1972 chapters 6 and 8). Co-solvent uptake of the dispersed polymer(s) may be decreased by increasing the Tg so that the dispersed polymer(s) is in the glassy region at ambient temperature, or by pre-crosslinking the dispersed polymer(s) as described above. Other ways of introducing pre-cross linking into dispersed polymer(s) are known in the art, for example U.S. Pat. No. 5,169,895 describes the preparation of pre-crosslinked polyester aqueous dispersions by the use of tri-functional isocyanates in the synthesis.

A known problem with many autoxidisable coating compositions is that the resultant coatings have a tendency to yellow, in particular where the autoxidisable groups are derived from polyunsaturated fatty acids, such as for example tung oil, linolenic acid, eleostearic acid, arachidonic acid, clupanadonic acid, and fatty acids obtainable from dehydrated castor oil. This may be unacceptable depending on the desired colour of the resultant coating. Preferably the aqueous composition has a starting yellowness value of less than 10, more preferably less than 7 and most preferably less than 4, when measured using the test method described herein. Preferably the aqueous composition has an increase in yellowing in darkness of less than 7, more preferably less than 5, most preferably less than 3 and preferably the aqueous composition has an increase in yellowing in daylight less than 12, more preferably less than 8 and most preferably less than 4 as measured by the test method described herein. Furthermore, the absolute yellowness (i.e. yellowness at start plus yellowness due to ageing) of the aqueous composition is preferably less than 12, more preferably less than 10, still more preferably less than 8, and most preferably less than 6.

In a further embodiment of the present invention there is provides an aqueous coating composition as defined herein comprising:

i) 3 to 26% of a crosslinkable oligomer(s) by weight of the composition of which at least 52 wt % is said crosslinkable polyester oligomer(s);

ii) 0 to 6.5% of a non-crosslinkable oligomer(s) by weight of the composition;

iii) 10 to 56% of dispersed polymer(s) by weight of the composition;

iv) 0 to 15% of co-solvent by weight of the composition;

v) 5 to 65% of water by weight of the composition;

where i)+ii)+iii)+iv)+v)=100%.

In another embodiment of the present invention there is provided an aqueous coating composition as defined herein comprising:

i) 15 to 40% of a crosslinkable oligomer(s) by weight of crosslinkable oligomer(s) and non-crosslinkable oligomer(s) and dispersed polymer(s) of which at least 52 wt % is said crosslinkable polyester oligomer(s);

ii) 0 to 10% of a non-crosslinkable oligomer(s) by weight of crosslinkable oligomer(s) and non-crosslinkable oligomer(s) and dispersed polymer(s);

iii) 50 to 85% of dispersed polymer(s) by weight of crosslinkable oligomer(s) and non-crosslinkable oligomer(s) and dispersed polymer(s);

where i)+ii)+iii)=100%.

The aqueous coating composition of the invention may be applied to a variety of substrates including wood, board, metals, stone, concrete, glass, cloth, leather, paper, plastics, foam and the like, by any conventional method including brushing, dipping, flow coating, spraying, and the like. They are, however, particularly useful for providing coatings on wood and board substrates. The aqueous carrier medium is removed by natural drying or accelerated drying (by applying heat) to form a coating.

Accordingly in a further embodiment of the invention there is provided a coating obtainable from an aqueous coating composition of the present invention. The aqueous coating composition of the invention may contain other conventional ingredients including pigments, dyes, emulsifiers, surfactants, plasticisers, thickeners, heat stabilisers, levelling agents, anti-cratering agents, fillers, sedimentation inhibitors, UV absorbers, antioxidants, dispersants, pigments, defoamers, co-solvents, wetting agents and the like introduced at any stage of the production process or subsequently. It is possible to include an amount of antimony oxide in the dispersions to enhance the fire retardant properties. Optionally external crosslinking agent(s) may be added to the aqueous composition of the invention to aid crosslinking during or after drying. Examples of reactive functional groups which may be utilised for external linking agent(s) include but are not limited to hydroxyl functional groups reacting with isocyanate (optionally blocked), melamine, or glycouril functional groups; keto, aldehyde and/or acetoacetoxy carbonyl functional groups reacting with amine or hydrazine functional groups; carboxyl functional. groups reacting with aziridine, epoxy or carbodiimide functional groups; silane functional groups reacting with silane functional groups; epoxy functional groups reacting with amine or mercaptane groups as well as carboxyl functional groups undergoing metal ion (such as zinc) crosslinking.

In particular, the aqueous coating compositions of the invention (if autoxidisable) and formulations containing them advantageously include a drier salt(s). Drier salts are well known to the art for further improving curing in unsaturated film-forming substances. Generally speaking, drier salts are metallic soaps, that is salts of metals and long chain carboxylic acids. It is thought that the metallic ions effect the curing action in the film coating and the fatty acid components confer compatibility in the coating medium. Examples of drier metals are cobalt, manganese, zirconium, lead, neodymium, lanthanum and calcium. The level of drier salt(s) in the composition is typically that to provide an amount of metal(s) within the range of from 0.01 to 0.5% by weight based on the weight of autoxidisable polyester oligomer(s) and or autoxidisable dispersed polymer(s).

Drier salts are conventionally supplied as solutions in white spirit for use in solvent-borne alkyd systems. They may, however, be used quite satisfactorily in aqueous coating compositions since they can normally be dispersed in such systems fairly easily. The drier salt(s) may be incorporated into the aqueous coating composition at any convenient stage. For example the drier salt(s) may be added prior to dispersion into water. Drier accelerators may be added to the drier salts. Suitable drier accelerators include 2,2'-bipyridyl and 1,10-phenanthroline.

If desired the aqueous dispersion of the invention can be used in combination with other polymer dispersions or solutions which are not according to the invention.

The present invention is now illustrated by reference to the following examples. Unless otherwise specified, all parts, percentages and ratios are on a weight basis. The prefix C before an example denotes that it is comparative. The term "working" means that the example is according to the invention. The term "non-working" means that it is not according to the invention (i.e. comparative).

BRIEF DESCRIPTION OF THE DRAWINGS

FIG. 1 shows the drying profile measured using a shear rate of $0.0997\ s^{-1}$.

FIG. 2 shows the drying profile measured using a shear rate of $0.990\ s^{-1}$.

FIG. 3 shows the drying profile measured using a shear rate of $9.97\ s^{-1}$.

FIG. 4 shows the drying profile measured using a shear rate of $78.6\ s^{-1}$.

TEST METHODS

Figure 1:
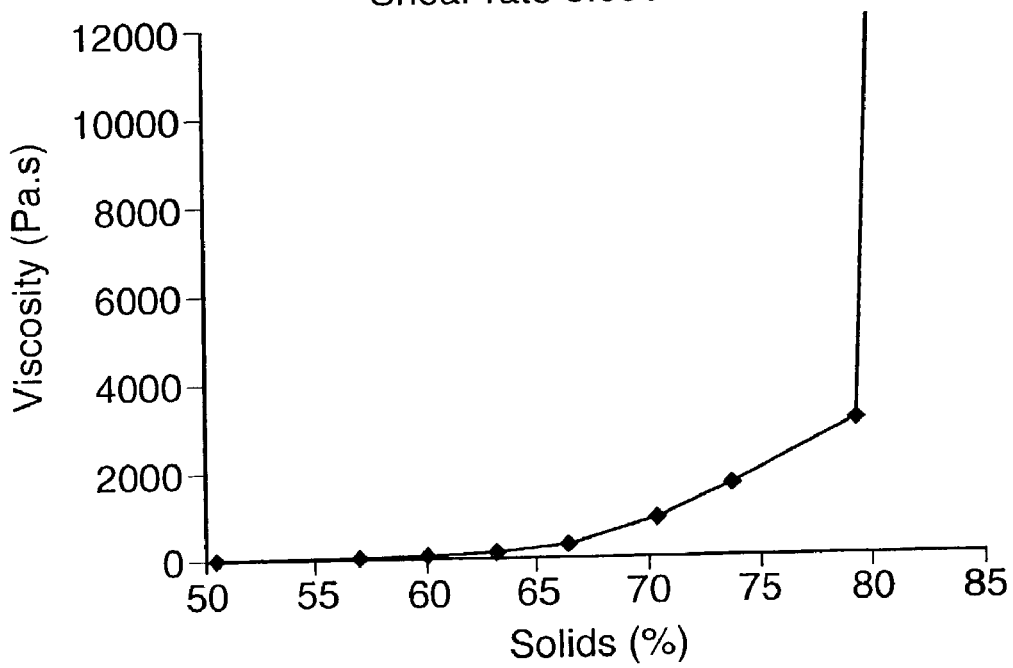
FIGS. 1 to 4 illustrate the drying profile of a composition according to the present invention [Example 6], where the equilibrium viscosity is measured as the solids content increases.

To test the open time and wet edge time aqueous compositions prepared as described in the examples below were applied using a wire rod to a test chart (18×24 cm, form 8B—display, available from Leneta Company) at a wet film thickness of 120 μm. Open time and wet edge time tests were performed at fairly regular time intervals according to the approximate expected final time in each case (being determined roughly from a trial run), the intervals between measurements decreasing towards the end of the run. The measurements were carried out at relative humidity levels of 50+/−5%, temperatures of 23+/−2° C. and an air flow ≦0.1 m/s.

Open Time:

The open time was determined by brushing a virgin 75 $cm^2$ area of the coated chart with a brush (Monoblock no 12, pure bristles/polyester 5408-12) carrying at regular intervals (as mentioned above) some more of the composition with a brush pressure of 100–150 g during 30 seconds. In this time the brush was moved in one set comprising 5 times in the direction of the width of the substrate and 5 times in the direction of length of the substrate before the coating was visually assessed. Once the composition carried on the brush no longer formed a homogeneous layer with the coating on the substrate the open time was considered to be over.

Wet Edge Time:

The wet edge time was determined by brushing at regular intervals (as mentioned above) a virgin 25 $cm^2$ edge area of the coated chart with a brush (Monoblock no 12, pure bristles/polyester 5408-12) carrying some more of the composition with a brush pressure of 100–150 g during 30 seconds. In this time the brush was moved in one set comprising 5 times in the direction of the width of the substrate and 5 times in the direction of length of the substrate before the coating was visually assessed. Once the composition carried on the brush no longer formed a homogeneous layer with the coating on the substrate and/or a visible lap line could be seen the wet edge time was considered to be over.

Drying Time:

To test the dust-free, tack-free and thumb-hard drying stages of the aqueous compositions prepared in the Examples as described below, the composition was applied to a glass plate at a wet film thickness of 80 μm. Drying time tests were performed at regular time intervals at relative humidity levels of 50+/−5%, temperatures of 23+/−2° C. and an air flow ≦0.1 m/s.

Dust-free Time:

The dust-free time was determined by dropping a piece of cotton wool (about 1 cm$^3$ i.e. 0.1 g) onto the drying film from a distance of 25 cm. If the piece of cotton wool could be immediately blown from the substrate by a person without leaving any wool or marks in or on the film, the film was considered to be dust-free.

Tack-free Time:

The tack-free time was determined by placing a piece of cotton wool (about 1 cm$^3$, 0.1 g) on the drying film and placing a metal plate (with a diameter of 2 cm) and then a weight of 1 kg onto the piece of cotton wool (for 10 seconds). If the piece of cotton wool could be removed from the substrate by hand without leaving any wool or marks in or on the film, the film was considered to be tack-free.

Thumb-hard Time:

The thumb-hard time was determined by placing the coated glass plate on a balance and a thumb was pressed on the substrate with a pressure of 7 kg. The thumb was then rotated 90° under this pressure. If the film was not damaged the coating was dried down to the substrate level and considered to be thumb-hard.

Viscosity:

All viscosity measurements were performed on a Bohlin Rheometer VOR or a TA Instruments AR1000N Rheometer, using the cup & spindle (C14), cone & plate (CP 5/30) and/or plate & plate (PP15) geometry, depending on the approximate viscosity of the sample to be measured.

Solution Viscosity

For the solution viscosity measurements (both at 50±2° C. and at 23±2° C.), the cone & plate (CP 5/30) geometry was used and the measurements were performed at a shear rate of 92.5 s$^{-1}$. If the oligomer solutions were too low in viscosity to remain in between the cone and the plate, the Cup & Spindle C14 geometry was used and the viscosity measurements were performed at a shear rate of 91.9 s$^{-1}$. For both geometries, the gap between the Cone and the Plate (or between the Cup and the Spindle) was set to 0.1 mm, prior to each measurement. The solution viscosities of the oligomers were measured using the solvent systems and the conditions as defined herein in the statements of invention:
1. The 80% solids solution: The oligomer was diluted (if necessary) with the appropriate solvent to an 80% solids solution (in NMP, BG or a mixture of NMP and BG at any ratio) which was homogenised by stirring the solution for 15 minutes at 50±2° C.
2. The 70% solids solution: The oligomer was diluted with the appropriate solvent (or mixture of solvents) to result in a 70% solids solution (either in NMP/water/DMEA or in BG/water/DMEA, or in (a mixture of NMP and BG at any ratio)/water/DMEA; in both solvent mixtures the solvents should be present in a weight ratio of 20/7/3, respectively) which was homogenised by stirring the solution for 15 minutes at 50° C. The resulting solution was subsequently cooled prior to the viscosity measurement at 23±2° C.
3. A sample of oligomer solution was placed in the appropriate measurement geometry (Cone & Plate CP 5/30 or Cup & Spindle C14 geometry). The solution viscosity of the oligomer was measured at a temperature of 50±2° C. for the 80% solids oligomer solution, and at ambient temperature for the 70% solids oligomer solution. A heating/cooling unit in the measurement geometry was used to control the temperatures.

Equilibrium Viscosity:

The equilibrium viscosity measurements were performed with the plate & plate geometry, with a 15 mm (P15) top-plate and a 30 mm (P30) bottom-plate. The gap between the two plates was set to 1.0 mm. All compositions were used at the solids level at which they were prepared and not diluted to lower solids levels.

Step 1: Three test charts were provided with coatings of identical film thickness. The coatings were applied with a 120 μm wire rod and the actual film thickness (and its uniformity) was checked with a wet film gauge, 20–370 μm, of Braive Instruments. The charts were dried under identical conditions in an environment where the airflow was <0.1 m/s.

Step 2: One test chart was used to determine the solids increase in time. The weight of the film was monitored in time, starting right after application of the film. After calculating the solids content at every measurement, a solids-time curve could be constructed and a trend line was calculated for the solids of the film as a function of the drying time.

Step 3: The other two test charts were used to determine the equilibrium viscosity in time: approximately every 5 minutes a sample was scraped from one test chart (in random order) and the viscosity of this sample was measured at 23° C. at representative shear rates of 0.0997 s$^{-1}$, 0.990 s$^{-1}$, 9.97 s$^{-1}$ and 78.6 s$^{-1}$. The measurements were continued for 90 minutes, unless reproducible sampling from the test charts could not be performed properly within that period of time (due to for example drying of the film to reach the dust free time).

Figure 2:
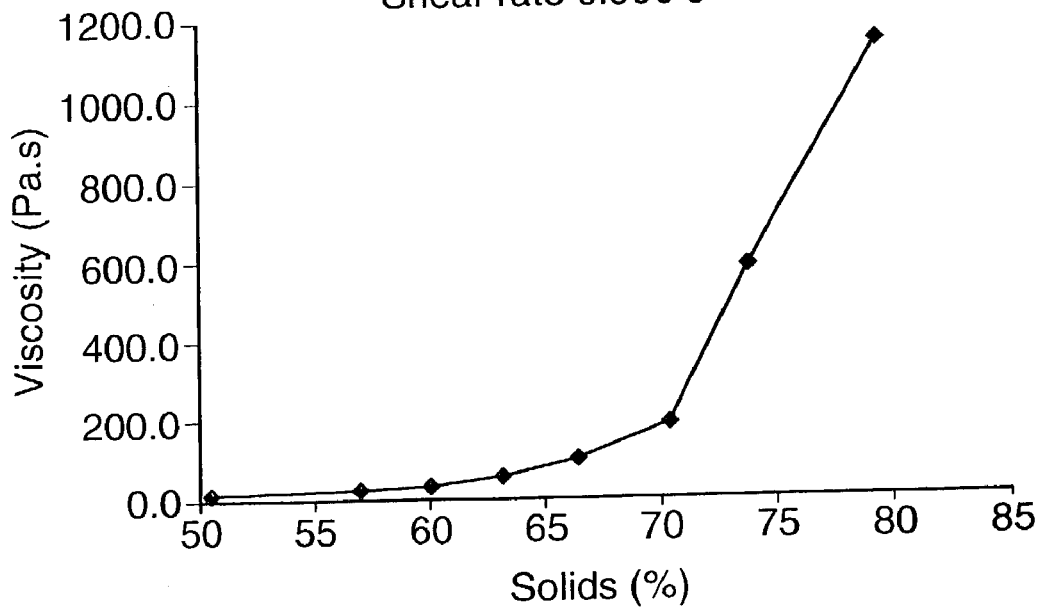
Figure 3:
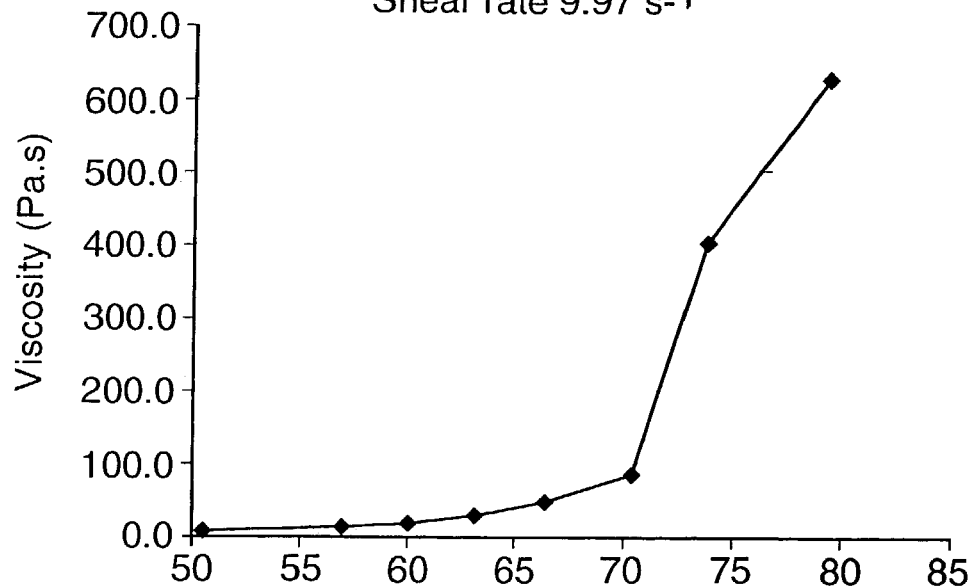
Figure 4:
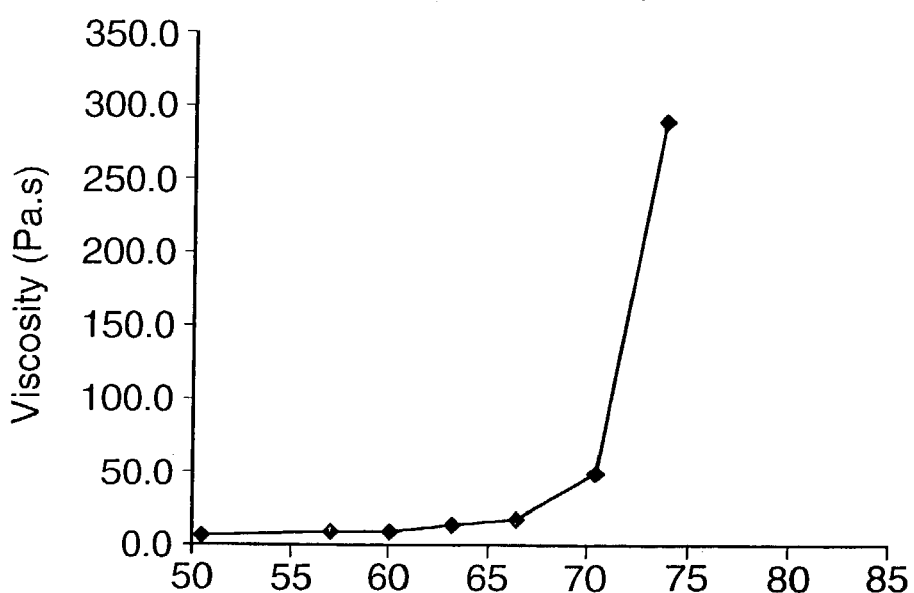

Step 4: The final drying curve of the coatings as shown in FIGS. 1 to 4 (in which the equilibrium viscosity is represented as a function of the solids of the drying film) could be constructed from the solids-time curve (Step 2) and the equilibrium viscosity data (Step 3). If the equilibrium viscosity at a shear rate of 9.97 s$^{-1}$ is lower than the equilibrium viscosity at a shear rate of 0.99 s$^{-1}$, which is turn is lower than the equilibrium viscosity at a shear rate of 0.0997 s$^{-1}$, the composition may be regarded as shear thinning. If this was the case the equilibrium viscosity at 78.6 s$^{-1}$ was not always measured as it would inherently always be lower than the equilibrium viscosity at a shear rate of 9.97 s$^{-1}$.

Measurement of Yellowing:

The yellowness of a fresh coating and the increased yellowing of a coating exposed to daylight or darkness for a specified time period was determined using a Tristimulus Colorimeter consisting of a data-station, a micro-colour meter, a calibration plate with a defined x, y and z value and a printer. The equipment was calibrated to the defined values of the calibration plate and then colour co-ordinates L, a and b, were measured. The colour co-ordinates define the brightness and colour on a colour scale, where 'a' is a measure of redness (+a) or greenness (−a) and 'b' is a measure of yellowness (+b) or blueness (−b), (the more yellow the coating, the higher the 'b' value). The co-ordinates 'a' and 'b' approach zero for neutral colours (white, grays and blacks). The higher the values for 'a' and 'b' are, the more saturated a colour is. The lightness 'L' is measured on a scale from 0 (white) to 100 (black).

The yellowing in daylight is defined as in the increase of the yellowness (Δb-day) of the coating during storage at 23±2° C. and in daylight for 28 days. The yellowing in the dark is defined as the increase in the yellowness (Δb-dark) of the coating during storage at 23±2° C., in the dark for 14 days.

Molecular Weight Determination:

Gel permeation chromatography (GCP) analyses for the determination of polymer molecular weights were performed on an Alliance Water 2690 GPC with two consecutive PL-gel columns (type Mixed-C, l/d=300/7. mm) using tetrahydrofuran (THF) as the eluent at 1 cm$^3$/min and using an Alliance Waters 2410 refractive index detector. A set of polystyrene standards (analysed according to DIN 55672) was used to calibrate the GPC.

Samples corresponding to about 16 mg of solid material were dissolved in 8 cm$^3$ of THF, and the mixtures were stirred until the samples had dissolved. The samples were left undisturbed for at lest 24 hours for complete "uncoiling" and subsequently were filted (Gelman Acrodisc 13 or 25 mm ø CR PTFE; 0.45 μm) and placed on the auto-sampling unit of the GPC.

All species with a molecular weight less than 1000 Daltons were ignored when calculating the Mw and PDi for the oligomers. When Daltons are used in this application to give molecular weight data, it should be understood that this is not a true molecular weight, but a molecular weight measured against polystyrene standards as described above.

Water Solubility Determination by a Centrifuge Test:

A sample of for example a crosslinkable polyester oligomer was dispersed in water and diluted with water/ammonia to 10% solids and the pH adjusted to the desired pH, within a range of from 2 to 10, and the dispersion was then centrifuged over 5 hours at 21000 rpm at 23±2° C. on a Sigma 3K30 centrifuge (21,000 rpm corresponds to a centrifugal force of 40,000 g. The pH chosen should be the pH where the crosslinkable vinyl oligomer is expected to be most soluble, for example often a pH of about 9 is suitable for anionic stabilised dispersions and a pH of about 2 is often suitable for cationic stabilised dispersions. After centrifugation a sample of the supernatant liquid was taken and evaporated for 1 hour at 105° C. to determine the solids content of the supernatant liquid. The water solubility percentage was calculated by dividing the amount of solids (in gram) of the supernatant by the total amount of solids put in the centrifuge tube and multiplying this by 100.

Water Resistance

The aqueous compositions prepared in the examples below were cast down on Leneta test charts Form 2C with a film thickness of 120 μm. The films were dried at room temperature for 4 hours and at 50° C. for 16 hours. After they were cooled down to room temperature the films were tested for water resistance. A few drops of water were placed on the films and covered with a watch glass. The water was removed after 16 hours at room temperature and the damage to the coating was assessed immediately and after four hours recovery. 0 Means that the coat is dissolved, 5 means that the coating is not affected at all.

| Materials & Abbreviations used: | |
|---|---|
| DEA = | N,N-diethylethanolamine |
| Cardura E10 = | Neodecanoic acid-2,3-epoxypropyl ester available from Shell |
| MPEG750 = | methoxypolyethylene glycol (Mn apprxoximately 750) |
| DMPA = | dimethylolpropionic acid |
| NMP = | N-methyl pyrrolidone |
| TDI = | toluene diisocyanate |
| Dowanol DPM = | dipropylene glycol monomethyl ether |
| DAPRO5005 = | drier salt available from Profiltra |
| 1,4-CHDM = | 1,4-cyclohexanedimethanol |
| Voranol P-400 = | polypropyleneglycol available from DOW Chemical |
| A1310 = | NCO functional silane component available from CK Witco Corporation |
| DMBA = | dibutylbutanoic acid |
| TMPME = | trimethylolpropanemonoallyl ether |
| TMPDE = | trimethylpropanediallylether |
| IPDI = | isophorone diisocyanate |
| TEA = | triethylamine |
| Combi LS = | drier salt available from Servo Delden |
| Boltorn H20 = | Dendritic polymer available from Perstorp |
| Nouracid LE80 = | linseed oil fatty acid available from AKZO Nobel |
| Fastcat 2005 = | tin(II)chloride available from Elf-Atochem |
| MEK = | methyl ethyl ketone |
| Atlas 4809 = | Alkyl phenol alkoxylate available from ATLAS Chemie |
| Atpol E5720/20 = | Fatty alcohol ethoxylate available from Uniqema |
| AP = | ammonium persulphate |
| Aerosol OT-75 = | Sodium dioctylsulphosuccinate available from Cytec |
| MMA = | methylmethacrylate |
| n-BA = | n-butylacrylate |
| AA = | acrylic acid |
| SLS = | Sodium Lauryl Sulphate |
| Akyposal NAF = | Sodium dodecylbenzenesulphonate available from KAO Chemicals |
| Natrosol 250LR = | Hydroxy ethyl cellulose available from Hercules |
| Akyporox OP-250V = | Octyl phenol ethoxylate available from KAO Chemicals |
| Surfactant = | Phosphate ester of nonyl phenol ethoxylate available from KAO Chemicals |
| VeoVa 10 = | Vinyl ester of versatic acid available from Shell |
| Desmodur W = | dicyclohexyl methane diisocyanate available from Bayer |
| Priplast 3192 = | Dimeric acid polyester polyol available from Uniqema |
| BMA = | n-butyl methacrylate |
| t-BHPO = | t-butyl hydroperoxide |
| Fe$^{III}$.EDTA = | ferric ethylene diamine tetracetic acid |
| IAA = | isoascorbic acid solution |
| STY = | Styrene |
| 2-EHA = | 2-Ethylhexylacrylate |
| Dynasilan MEMO = | 3-Methacryloxypropyltrimethoxysilane available from Degussa |
| HEMA = | Hydroxyethylmethacrylate |
| TEGDMA = | Triethyleneglycoldimethacrylate |
| OMKT = | n-octyl mercaptane |
| TAPEH = | tert-amylperoxy-2-ethyl hexanoate |
| Silquest A.174NT = | 3-methacryloxypropyl trimethoxysilane available from Witco |
| Water = | demineralised water |
| PW602 = | Transparent red iron-oxide pigment dispersion available from Johnson Matthey |
| AMP-95 = | 2-amino-2-methyl-1-propanol (available from Integrated Chemicals bv, 95% in water) |
| Dehydran 1293 = | Defoamer additive available from Cognis; 10% in butyl glycol |
| Surfynol 104 E = | wetting agent available from Air Products; 50% in ethylene glycol |
| NeoCryl BT-24 = | Acrylic emulsion polymer available from NeoResins, Avecia bv |
| SAN = | succinic anhydride |
| ADH = | Adipic acid dihydrazide |

Preparation of a Poly-alkoxylated Adduct MPEG750/SAN:

A 2-L 3-necked round bottom flask, equipped with stirrer, was loaded with methoxypolyethylene glycol (Mn ca. 750; 1323.53 g) and succinic anhydride (176.47 g) in a nitrogen atmosphere. The reaction mixture was heated to 120° C., and was stirred at this temperature until all the anhydride had reacted, as judged from the Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$). The clear liquid product was then cooled to 50° C. and collected. The product solidified when left undisturbed at ambient temperature.

Crosslinkable Polyester Oligomer E1:

Phase 1: A 2 litre, five-necked reactor flask fitted with a stirrer, a thermometer and a condenser fitted with a Dean-Stark condensate trap, was loaded with adipic acid (156.49 g), Prifac 8961 (sunflower oil fatty acid, Trademark from Uniqema; 391.22 g), trimethylol propane (TMP; 78.24 g) and pentaerythritol (PE; 130.41 g) in a nitrogen atmosphere. The resulting slurry was heated to 210° C. under vigorous stirring and the reaction water was distilled off. After two hours of reaction time, a portion of Fastcat 2005 (stannous (II)chloride, Trademark from Elf-Atochem; 0.26 g) was added to the reaction mixture. After 6 hours reaction time the acid value had dropped to 6.5 mg KOH/g and the viscous mixture was cooled to 120° C. In the second phase succinic anhydride (78.24 g) was added to the reaction mixture in one portion. The contents of the reactor were stirred at 120° C. until all the anhydride had reacted, as judged from the Infra Red spectrum of the reaction mixture (the anhydride groups typically show two absorptions at 1785 cm$^{-1}$ and 1865 cm$^{-1}$, which disappeared and were replaced by a new ester carbonyl absorption at 1740 cm$^{-1}$). The resultant acid-functional polyester oligomer E1 was cooled to room temperature and collected. The oligomer had an acid value of 54 mg KOH/g.

The polyester oligomer had a viscosity of 523 mPa.s, when measured at a shear rate of 91.9 5 s$^{-1}$, at 50° C. and at a solids content of 80% by weight in BG, and a viscosity of 1,130 mPa.s, when measured at a shear rate of 91.9 s$^{-1}$, at 23° C. and at a solids content of 70% by weight in a solvent mixture of BG/H$_2$O/DMEA=20/7/3.

The crosslinkable polyester oligomers E2 to E8 were prepared according to similar procedures using the components shown in Table 1 below, with the following changes:

Crosslinkable Polyester Oligomer E2:

3-Isocyanato-propyl triethoxy silane (Silquest A-1310) post-modification, for the preparation of oligomer E2, was performed by mixing the OH-functional hyper-branched polyester and IPTS at room temperature, followed by addition of a catalytic amount of dibutyltin dilaurate and subsequent heating of the reaction mixture to 50° C. The mixture was stirred at this temperature until all the isocyanate had reacted, as judged from the Infra Red spectrum of the reaction mixture (the NCO groups typically show an absorption at 2275 cm$^{-1}$). NMP was used as co-solvent in this reaction.

Crosslinkable Polyester Oligomer E3:

The polyester oligomer E3, with a combination of fatty acid and allyl functionality, was prepared by the reaction of an OH-functional fatty acid polyester oligomer (the product of phase 1 and 2), with SAN (phase 3), followed by the reaction of the resulting carboxylic acid group bearing polyester with allyl glycidyl ether (AGE) at 110° C. (phase 4).

Crosslinkable Polyester Amide Oligomer E8:

The polyester amide oligomer E8 was prepared from a fatty amide. The fatty amide was prepared by the reaction of N,N-diethanolamine with sunflower oil, catalysed by NaOMe, by stirring the reaction mixture for 4 hours at 110° C. in a nitrogen atmosphere. The esterification reaction to form oligomer 8 was conducted at 180° C. until an acid value of 20 mg KOH/g was obtained. This acid value corresponds to the theoretical acid value when the acid group of DMPA is left unreacted. The OH value was 264 mg/KOH.

Water Solubility

Crosslinking polyester oligomers E2, E4 and E7 were respectively 100%, 7.9% and 32.5% water soluble as measured by the centrifuge test.

TABLE 1

| | E2[b] | E3[c] | E4[d] | E5 | E6 | E7 | E8 |
|---|---|---|---|---|---|---|---|
| Isophthalic acid (g) | — | — | — | 93.86 | — | — | — |
| Adipic acid (g) | 242.32 | 101.25 | 234.89 | — | — | 300.00 | 295.61 |
| CHDA (g) | — | — | — | — | 158.30 | — | — |
| DMPA (g) | — | — | — | — | — | — | 68.26 |
| Levulinic acid (g) | 170.20 | — | — | — | — | 150.00 | — |
| Fatty acid | — | — | Prifac 8961 | Dedico 5981 | Prifac 8961 | Prifac 8961 | — |
| Fatty acid (g) | — | — | 392.70 | 40.91 | 1273.50 | 500.00 | — |
| Fatty amide (g) | — | — | — | — | — | — | 918.50 |
| SSIPA (g) | — | 38.56 | — | — | — | 76.50 | — |
| NPG (g) | 52.40 | 69.43 | 44.00 | 17.45 | — | 128.25 | — |
| Trimethylolpropane (g) | 230.91 | 60.26 | 328.84 | 54.88 | 134.10 | 280.00 | — |
| Pentaerythritol (g) | — | — | — | 24.55 | 134.10 | — | — |
| MPEG 750 (g) | — | — | — | — | — | — | 72.00 |
| MPEG 750/SAN (g) | 55.12 | 120.22 | — | 35.55 | — | — | — |
| CHDM (g) | — | — | — | — | — | — | 31.62 |
| SnCl$_2$.H$_2$O (catalyst) (g) | 0.30 | 0.50 | 0.50 | 0.07 | 1.00 | 0.50 | 0.50 |
| Acid value (mg KOH/g) | 5.80 | 4.20 | 5.20 | 1.60 | 0.86 | 8.40 | 19.60 |
| CoatOSil CS1770 (g) | — | 143.10 | — | — | — | — | — |
| SAN (g) | 35.50 | — | 60.00 | 43.40 | — | — | — |
| DMAP (g) | 0.70 | — | 0.10 | 0.20 | — | — | — |
| DBTDL (g) | — | 0.10 | — | — | — | — | — |
| Allyl glycidyl ether (g) | — | — | 57.00 | — | — | — | — |
| DMBA (g) | — | — | 4.00 | — | — | — | — |
| BG (g) | — | — | — | — | — | — | — |

TABLE 1-continued

|  | Components | | | | | | |
|---|---|---|---|---|---|---|---|
|  | E2[b] | E3[c] | E4[d] | E5 | E6 | E7 | E8 |
| NMP (g) | — | 125.03 | 9.90 | 71.82 | — | — | — |
| Final Acid value (mg KOH/g) | 33.94 | 3.01 | 5.47 | 91.54 | 0.86 | 8.40 | 19.60 |
| Solution viscosity* | 2950 | 10100 | 131 | 135000 | 41 | 336 | 198 |
| Solution viscosity** | 3920 | 5540 | 349 | 88300 | 356 | 551 | 457 |
| Mw | 39456 | 32370 | 3621 | 24542 | 59300 | 3599 | 7422 |
| PDi | 21.6 | 15.7 | 2.0 | 12.4 | 6.7 | 2.7 | 3.5 |

[b]Phase 1: AA, MPEG750/SAN, TMP, NPG; phase 2: levulinic acid; phase 3: SAN, DMAP
[c]Phase 1: TMP, NPG, SSIPA; phase 2: AA, MPEG750/SAN; phase 3: CoatOSil CS1770, DBTDL, NMP
[d]Phase 1: AA, TMP, NPG; phase 2: Prifac 8961; phase 3: SAN, DMAP, NMP; phase 4: AGE, DMBA
*50° C., 80% solids in NMP at 91.9 s-1 (mPa · s)
**23° C., 70% solids in NMP/H2O/DMEA at 91.9 s-1 (mPa · s)

Preparation of Dispersion dE1 from Crosslinkable Polyester Oligomer E1:

A 500 cm³ three-necked reactor flask fitted with a stirrer and a thermometer was charged with the polyester oligomer E1 solution (200.0 g, 80% solids) prepared above and the content was heated to 65° C. under a nitrogen atmosphere. At this temperature, a drier salt (DAPRO5005, trademark from Profiltra, 2.4 g), dipropylene glycol methyl ether (20.54 g), ATLAS G4809 (trademark from Uniqema, 70% aqueous solution, 8.0 g), N,N-dimethyl ethanolamine (DMEA, 17.13 g) and water (53.86 g) were subsequently added to the stirred polyester oligomer solution while the temperature was kept at 65° C. The resulting mixture (275.0 g) was slowly added over a period of 30 minutes to hot water (333.93 g, 50° C.) in a 1-L reactor under a nitrogen atmosphere while the temperature of the stirred aqueous phase was kept at 45 to 50° C. The resulting dispersion was stirred for an additional 30 minutes at 45 to 50° C. and subsequently cooled to room temperature, filtered and collected. The resultant translucent polyester dispersion dE1 had a solids content of 26.3%.

The crosslinkable polyester oligomer dispersions dE2 to dE8 were prepared according to similar procedures using the components listed in Table 2 below. Polyester oligomers that were dispersed with the use of a mini-emulsion prepared from the Atlas G5000, dodecanol and water (dE4, dE5 and dE6) were dispersed under high shear (Dispermat, 7000 rpm). DE8 was first prepared as a predispersion. DE2 included as additives NH₃ (25% aq, 4.55 g) and ADH (2.7 g) and dE7 included ADH (1.11 g) as an additive.

Preparation of a Crosslinkable Urethane Oligomer U1, and Its Dispersion DU1:

The first step of this preparation provides an isocyanate-reactive material bearing crosslinker groups for use in the synthesis of the self-crosslinkable polyurethane oligomer, the isocyanate-reactive groups being hydroxyl and the crosslinker groups being fatty acid groups. A 1-L 3-necked round bottom flask, equipped with a stirrer and a thermometer, was loaded with N,N-diethanolamine (DEA) (100.00 g), NaOMe (0.52 g) and sunflower oil (505.10 g) in a nitrogen atmosphere. The hazy reaction mixture was stirred at 110–120° C. until a clear mixture was obtained. Stirring at the given temperature was continued until a DEA-conversion of at least 90% was achieved, as determined by titration of residual amine functionality in the product with 1 N aqueous HCl. A conversion of 94% was achieved. The product was then cooled to room temperature and stored under nitrogen.

In the second step, a 1-L 3-necked round bottom flask, equipped with a stirrer and a thermometer, was loaded with dimethylolpropanoic acid (DMPA; 19.36 g), N-methyl pyrrolidone (NMP; 92.50 g), methoxypolyethylene glycol (MPEG750; 18.87 g), cyclohexane dimethanol (CHDM; 8.97 g), the alkyd polyol mixture described above (260.43 g) and toluene diisocyanate (TDI; 99.89 g). The reactor was purged with nitrogen and the reaction mixture was slowly heated to 50° C. and stirred at this temperature for 1 hour in a nitrogen atmosphere. The mixture was then heated to 80° C. and kept at this temperature for 1 hour. The resultant NCO-free alkyd urethane oligomer U1 was then cooled to

TABLE 2

|  | Components | | | | | | |
|---|---|---|---|---|---|---|---|
|  | dE2 | dE3 | dE4 | dE5 | dE6 | dE7 | dE8 |
| Oligomer (g) | 50.00 | 51.00 | 50.00 | 42.90 | 50.00 | 50.00 | 150.00 |
| Dodecanol (g) | — | — | 2.00 | 2.00 | 2.00 | 1.32 | — |
| NMP or DPM* (g) | — | — | — | 8.58 | 2.50* | — | 22.5/15.0* |
| DAPRO 5005 (g) or Borchersdry VP0133** (g) | — | — | 1.00 | 1.00 | 1.00 | 1.00** | 2.25 |
| ATLAS G5000 | — | — | 2.00 | 2.00 | 2.00 | 1.32 | — |
| Neutralising agent type | DMEA | NH₃ | DMEA | DMEA | DMEA | NH₃ | DMEA |
| Neutralising agent (g) | 2.80 | 3.16 | 0.40 | 5.20 | 0.06 | 0.55 | 4.67 |
| Water (g) | 106.20 | 81.80 | 72.10 | 26.05 | 72.40 | 101.87 | 36.78 |
| Dispersion solids (%) | 31.7 | 30.1 | 40.9 | 40.1 | 40.1 | 33.0 | 65.0 |
| Dispersion pH | 8.2 | 7.9 | 7.1 | 7.7 | 7.0 | 7.6 | 7.7 |

NH₃ was used as 25% aq

70° C. and diluted with dipropylene glycol monomethyl ether (51.38 g), N,N-dimethylethanolamine (DMEA; 10.27 g), DAPRO 5005 (5.84 g) and water (155.43 g). The mixture was homogenised at 55 to 60° C. and subsequently fed into water (907.1 g; 50° C.) in a separate reactor in a nitrogen atmosphere. The product dispersion was cooled to ambient temperature, filtered and stored in a nitrogen atmosphere. The dispersion DU1 has a solids content of 24.2% and a pH of 7.1.

The viscosity of an 80% solids solution in NMP (50° C., shear rate 91.1 s$^{-1}$) is 6.61 Pa.s.

The viscosity of a 70% solids solution in NMP/H$_2$O/DMEA (20/7/3) (23° C., shear rate 91.9 s$^{-1}$) is 10.91 Pa.s.

GPC analysis of U1: Mw=4,917; Mn=2,535; PDi=1.94

Acid value of U1=19.1 mgKOH/g

Preparation of a Non-Crosslinkable Urethane Oliqomer U2, and Its Dispersion DU2:

In a nitrogen atmosphere, a 1-L 3-necked round bottom flask, equipped with a stirrer and a thermometer, was loaded with dimethylolpropanoic acid (DMPA; 48.00 g), N-methyl pyrrolidone (NMP; 240.00 g), methoxypolyethylene glycol (MPEG750; 19.20 g) and polypropylene glycol (Voranol P400, trademark from Dow Europe; 618.64 g). At 50° C., toluene diisocyanate (TDI; 274.16 g) was fed into this polyol mixture while the contents of the reactor were stirred. After the TDI feed was complete, the reaction mixture was heated to 80° C. and stirred at this temperature for 1 hour. The resultant NCO-free urethane oligomer U2 was then cooled to 70° C.

A portion of this urethane oligomer (949.80 g) was diluted with dipropylene glycol monomethyl ether (97.60 g) and N,N-dimethylethanolamine (DMEA; 25.51 g) at 60° C. and the resulting mixture was stirred for 15 min at this temperature. Then hot water was added (50° C.; 295.25 g) and the resulting predispersion was stirred for an additional 15 min at 55 to 60° C. A portion of 1100.00 g of this mixture was subsequently fed into water (919.97 g; 50° C.) in a separate reactor over a period of 60 minutes in a nitrogen atmosphere. After complete addition, the final dispersion was stirred for an additional 15 minutes at 45–50° C., then cooled to ambient temperature, filtered and stored under nitrogen. The dispersion DU2 has a solids content of 24.2%, and a pH or 7.7.

The viscosity of an 80% solids solution in NMP (50° C., shear rate 91.1 s$^{-1}$) is 57 Pa.s.

The viscosity of a 70% solids solution in NMP/H$_2$O/DMEA (20/7/3) (23° C., shear rate 91.9 s$^{-1}$) is 36.7 Pa.s.

GPC analysis of U2: Mw=10,251; Mn=4,476; PDi=2.29

Acid value of U2=20.93 mg/KOHg.

Preparation of Dispersed Vinyl Polymer P1

A 2-L 3-necked round bottom glass reactor, equipped with stirrer, thermometer and vortex breakers was loaded with demineralised water (652.57 g), Atpol E5720/20 (4.99 g) and Borax.10H2O (3.57 g) in a nitrogen atmosphere. The mixture was heated whilst stirring to 80° C. and then a solution of AP (2.31 g) in demineralised water (16.00 g) was added. In a dropping funnel a pre-emulsion was prepared by stirring a mixture of demineralised water (161.87 g), Atpol E5720/20 (94.85 g), Aerosol OT-75 (7.20 g), Borax.10H2O (1.07 g), MMA (534.18 g), n-BA (444.32 g) and AA (19.97 g). 5% of this pre-emulsion was added to the reactor at 80° C. over 5 minutes. The remainder was fed into the reactor over 160 minutes at 85° C. A solution of AP (0.53 g) in demineralised water (7.88 g) was added to the reactor during the first 15 minutes of feeding the pre-emulsified feed. Then the reactor content was kept at 85° C. for 30 minutes, and then cooled to ambient temperature. The pH was adjusted to 8 to 8.5 with 12.5% aqueous ammonia. The resultant product (P1) was filtered and collected.

The properties of P1 are listed in Table 4.

Preparation of a Sequential Dispersed Vinyl Polymer P2

A 2-L 3-necked round bottom glass reactor, equipped with stirrer, thermometer and vortex beakers, was loaded with demineralised water (990.94 g), SLS (30%, 0.55 g) and NaHCO$_3$, (4.44 g) in a nitrogen atmosphere. The mixture was heated whilst stirring to 80° C. and then a solution of AP (0.89 g) in demineralised water (5.00 g) was added. In a dropping funnel a monomer mixture was prepared by stirring MMA (140.48 g), n-BA (207.71 g) and AA (7.11 g). 10% of this mixture was added to the reactor at 80° C. The remainder was fed into the reactor over a period of 40 minutes at 85° C. The content of a separate dropping funnel, containing demineralised water (20.00 g), AP (0.36 g) and SLS 30% (11.62 g) was added in the same time. The reactor content was kept at 85° C. for 30 minutes. A second monomer mixture was prepared in a dropping funnel consisting MMA (464.91 g), n-BA (57.37 g) and AA (10.66 g). The mixture was fed to the reactor after the 30 minutes period in 60 minutes. The content of a separate dropping funnel, containing demineralised water (30.00 g), AP (0.53 g) and SLS 30% (17.44 g) was added in the same time. The reactor content was kept at 85° C. for 45 minutes and then cooled to ambient temperature. The pH was adjusted to 8 to 8.5 with 12.5% aqueous ammonia. The resultant product P2 was filtered and collected.

The properties of P2 are listed in Table 4.

Preparation of Dispersed Vinyl Polymer P3

A 2-L 3-necked round bottom glass reactor, equipped with stirrer, thermometer and vortex breakers, was loaded with demineralised water (194.50 g), Akyposal NAF (3.00 g), Borax.10H2O (1.25 g), Acetic acid (0.50 g) and Natrosol 250LR (10.00 g) in a nitrogen atmosphere. The mixture was heated whilst stirring to 60° C. and then a solution of AP (0.50 g) in demineralised water (10.00 g) was added. In a dropping funnel a pre-emulsion was prepared by stirring with demineralised water (171.71 g), Akyposal NAF (3.00), Borax.10H2O (1.25 g), Acetic acid (0.50 g) and Akyporox OP-250V (14.29 g) followed by VeoVa 10 (125.00 g) and vinyl acetate (375.00 g). 10% of this mixture was added to the reactor at 60° C. The mixture was heated whilst stirring to 80° C. The remainder was fed into the reactor over 90 minutes at 80° C. The content of a separate dropping funnel, containing a solution of AP (1.15 g) in demineralised water (60.00 g), was added in the same time. Then the reactor content was kept at this temperature for 120 minutes and then cooled to ambient temperature. The pH was adjusted to 8 to 8.5 with 12.5% aqueous ammonia. The resultant product P3 was filtered and collected.

The properties of P3 are listed in Table 4.

Preparation of the Dispersed Urethane Acrylic Polymer P4

Stage 1: A 1-L 3-necked round bottom flask, equipped with a stirrer and a thermometer, was loaded with NMP (100.00 g), DMPA (24.00 g), Desmodur W (152.68 g) and Priplast 3192 (223.33 g) in a nitrogen atmosphere. The reaction mixture was heated to 55° C., tin octoate (0.05) was added and the temperature was raised to 90–95° C. The mixture was kept at this temperature for 1 hour before adding tinoctoate (0.05) and the mixture was kept at 90° C. for an additional hour. The NCO-concentration of the mixture was found to be 4.83%. The resulting NCO terminated urethane prepolymer (500.05 g) (from which samples of a total weight of 10.0 g were taken for % NCO determination, leaving 490.05 g of prepolymer) was then cooled to 70° C., neutralised with TEA (17.75 g) diluted with BMA (196.02 g) and homogenised for 15 minutes at 65° C.

Stage 2: A 2-L 3-necked round bottom flask, equipped with a stirrer and thermometer, was loaded with a water phase consisting of water (1045.77 g) and BMA (174.00 g) in a nitrogen atmosphere. A portion of the urethane prepolymer (625.00 g) prepared in Stage 1 (at 60–65° C.) was fed into the reactor over 1 hour, keeping the temperature of the reactor contents below 30° C. After the feed was complete, the mixture was stirred for an additional 5 minutes before chain-extension by the addition of an aqueous 64.45% hydrazine hydrate solution ($N_2H_4.H_2O$, 11.43 g in 25.00 g $H_2O$). A reactor temperature of 36° C. was reached. Subsequently, a 5% aqueous initiator solution of t-BHPO (18.10 g) and a 1% aqueous solution of $Fe^{III}.EDTA$; 4.63 g) was added to the reaction mixture. The radical polymerisation was started by the addition of a 1% aqueous iAA (45.24 g) and the reaction temperature was allowed to reach 56° C. before more aqueous iAA (45.24 g) was added. The reaction mixture was homogenised for 15 minutes, then cooled to room temperature, filtered over a 200-mesh sieve and collected. The properties of P4 are listed in Table 4.

Preparation of Dispersed Vinyl Polymer P5

A 2-L 3-necked round bottom glass reactor, equipped with stirrer, thermometer and baffles, was loaded with demineralised water (990.94 g), SLS 30% (0.55 g) and $NaHCO_3$ (4.44 g) in a nitrogen atmosphere. The mixture was heated whilst stirring to 80° C. and then a solution of AP (0.89 g) in demineralised water (5.00 g) was added. STY (468.54 g), 2-EHA (361.69 g) and M (58.00 g) were mixed in a dropping funnel. 10% of this mixture was added to the reactor at 80° C. and remainder was fed into the reactor over 100 minutes at 85° C. The content of a separate dropping funnel, containing demineralised water (50.00 g), AP (0.89 g) and SLS 30% (29.06 g) was added in the same time and the reactor content was kept at 85° C. for 45 minutes and then cooled to 60° C. At 60° C. a burn-up was applied by adding a solution of iAA (2.60 g) in demineralised water (49.00 g) to the reactor followed by a mixture of t-BHPO (80%, 2.40 g) and demineralised water (18.00 g). After 60 minutes the reactor content was cooled to ambient temperature. The pH was adjusted to 8 to 8.5 with 12.5% aqueous ammonia. The product P5 was filtered and collected. The properties of P5 are listed in Table 4.

Preparation of Dispersed Polymers P6 to P11 and P13 and P14

The dispersed polymers P6 to P11 and P13 and P14 were prepared using the method described for P5 with the variations as listed in Table 3. The properties of P6 to P11 are listed in Table 4. P13 has a weight average molecular weight of 22097, an Mn of 10451 and a PDi of 2.11. The Mn's and Mw's of P1 to P12 and P14 could not be measured.

Preparation of a Fatty Acid Functional Dispersed Polymer P12

In a 1L 3-necked round bottom reactor, equipped with stirrer and $N_2$ inlet, Nouracid LE80 (398.8 g), GMA (201.2 g), Irganox 1010 (0.10 g), Phenothiazine (0.10 g) and benzyl trimethylammonium hydroxide (40 wt % in water; 1.05 g) were loaded. The reactor was purged with nitrogen and the yellow reaction mixture was heated and stirred at 155° C. until the acid value had dropped to 3.7 mg KOH/g. After cooling to ambient temperature, the product was collected and stored under nitrogen.

A portion of 161.3 g of this adduct was mixed with MAA (40.3 g) and transferred into a dropping funnel. This mixture was slowly added over a period of one hour to a 1L 3-necked round bottom reactor containing a solution of lauroyl peroxide (21.4 g) in butyl glycol (273.0 g) at 125° C. in a nitrogen atmosphere. After complete addition, the resulting copolymer solution was cooled to 50° C. and subsequently concentrated in vacuo to 80% solids using a rotary evaporator. To the resulting yellow solution, a mixture of water (580.0 g), aqueous ammonia (25%; 12.0 g) and SLS (4.4 g) was added at 70° C. A mixture of MMA (225.5 g) and BA (92.5 g) was added to the resulting dispersion and the reaction mixture was stirred for 30 minutes at 70° C. The reaction mixture was heated to 85° C. and a solution of ammonium persulphate (0.86 g) in water (20.0 g) was added over a period of 10 min. The mixture was stirred at 85° C. for 3 h. Then a second portion of ammonium persulphate (0.86 g) in water (20.0 g) was added and the mixture was stirred at 85° C. for 30 minutes. Then a third portion of ammonium persulphate (0.86 g) in water (20.0 g) was added and the mixture was stirred for an additional 30 minutes at 85° C. The resulting dispersion was cooled to ambient temperature, filtered and stored under nitrogen. The dispersion had a solids content of 39.3%, a pH of 7.7 and contained 2.59% butyl glycol on total dispersion.

TABLE 3

| | Components (g) | | | | | | | |
|---|---|---|---|---|---|---|---|---|
| | P6 | P7 | P8 | P9 | P10 | P11 | P13 | P14 |
| Reactor phase | | | | | | | | |
| Water | 912.19 | 960.66 | 990.94 | 1001.24 | 960.66 | 990.94 | 1001.84 | 952.57 |
| SLS 30% | — | 72.94 | 0.55 | — | 72.94 | 0.55 | — | — |
| Surfactant | 0.83 | — | — | — | — | — | — | 0.92 |
| $NaHCO_3$ | 4.12 | 4.38 | 4.44 | 4.46 | 4.38 | 4.44 | 4.39 | 4.57 |
| Shot at 80° C. | | | | | | | | |
| AP | 0.83 | 0.88 | 0.89 | 0.89 | 0.88 | 0.89 | 0.88 | 0.92 |
| water | 5.00 | 5.00 | 5.00 | 5.00 | 5.00 | 5.00 | 5.00 | 5.52 |
| Monomer mixture | | | | | | | | |
| STY | — | — | — | — | — | 399.70 | — | — |
| MMA | 577.36 | 332.60 | 617.32 | 352.94 | 759.26 | 124.35 | 346.07 | 611.55 |
| BA | 236.86 | 402.63 | 253.15 | 521.85 | 89.76 | 133.24 | 511.70 | 239.02 |
| BMA | — | — | — | — | — | 204.29 | — | — |

TABLE 3-continued

| | Components (g) | | | | | | | |
|---|---|---|---|---|---|---|---|---|
| | P6 | P7 | P8 | P9 | P10 | P11 | P13 | P14 |
| AA | 16.62 | — | 17.77 | 17.85 | 17.51 | 17.77 | 17.51 | 18.29 |
| MAA | — | 87.53 | — | — | — | — | — | — |
| Dynasilan MEMO | 41.54 | — | — | — | — | — | — | — |
| HEMA | — | 52.52 | — | — | — | — | — | — |
| TEGDMA | — | — | — | — | 8.75 | — | — | — |
| IOTG | — | — | — | — | — | — | 17.01 | — |
| AAEM | — | — | — | — | — | — | — | 45.73 |
| | | | Separate feed | | | | | |
| water | 50.00 | 50.00 | 50.00 | 50.00 | 50.00 | 50.00 | 50.00 | 52.50 |
| AP | 0.83 | 0.88 | 0.89 | 0.89 | 0.88 | 0.89 | 0.88 | 0.92 |
| SLS 30% | — | — | 29.06 | 14.88 | — | 29.06 | 14.59 | — |
| Surfactant | 123.79 | — | — | — | — | — | — | 136.72 |

P11 only = Burn-up at 60° C. with IAA (0.88 g) water (12 g) tBHPO (0.88 g) and water (26.7 g)

TABLE 4

| | Parameter | | | | | | | | | | | | | |
|---|---|---|---|---|---|---|---|---|---|---|---|---|---|---|
| | P1 | P2 | P3 | P4 | P5 | P6 | P7 | P8 | P9 | P10 | P11 | P12 | P13 | P14 |
| Solids [wt %] | 51.2 | 45.1 | 50.3 | 35.2 | 42.4 | 44.6 | 21.4 | 45.0 | 45.0 | 44.6 | 44.3 | 39.3 | 44.5 | 44.5 |
| pH | 8.3 | 8.3 | 8.2 | 7.9 | 8.3 | 8.2 | 8.0 | 8.2 | 8.2 | 8.3 | 8.2 | 7.7 | 8.4 | 8.4 |
| Particle size [nm] | 450 | 230 | 330 | 65 | 255 | 390 | 69 | 307 | 590 | 230 | — | 350 | 406 | |
| Measured Tg*[° C.] | 25 | 2 | 24 | 43 | 27 | 58 | 40 | 57 | 2 | 96 | 54 | 49 | −7 | 51 |
| Acid value** | 15.6 | 15.6 | 0 | 12.4 | 50.6 | 15.6 | 63.4 | 15.6 | 15.6 | 15.6 | 15.6 | — | 15.6 | 15.6 |

*with DSC (midpoint)
**Theoretical on solids [mgKOH/g]

Preparation of Blends of the Dispersed Oligomers and Dispersed Polymers Prepared Above.

Preparation of a Blend of Oligomer Dispersion DE1 and Dispersed Polymer P1=E1P1

In a nitrogen atmosphere, a 1-L 3-necked round bottom flask, equipped with a stirrer, was loaded with dispersion DE1 (75.00 g) and the vinyl polymer latex P1 (38.50 g). The mixture was stirred for 30 minutes at ambient temperature, filtered and then stored under nitrogen. The resultant dispersion E1P1 had a solids content of 34.71% by weight.

The oligomer/polymer blends listed in Table 5 below were prepared using the method described above for E1P1.

TABLE 5

| | Components | | | | | |
|---|---|---|---|---|---|---|
| | DE1 | E1P1 | E1P2 | E1P3 | E1P4 | E2P5 |
| | | | Oligomer | | | |
| | DE1 | E1 | E1 | E1 | E1 | E2 |
| Oligomer (g) | 130.00 | 75.00 | 75.00 | 75.00 | 75.00 | 100.00 |
| Oligomer (% of solids) | 100.00 | 50.00 | 50.00 | 50.00 | 50.00 | 70.00 |
| Polymer | — | P1 | P2 | P3 | P4 | P5 |
| Polymer (g) | — | 38.50 | 43.70 | 39.20 | 56.00 | 32.10 |
| Polymer (% of solids) | — | 50.00 | 50.00 | 50.00 | 50.00 | 30.00 |
| Dispersion solids % | 26.3 | 34.7 | 33.2 | 34.5 | 30.1 | 34.4 |
| pH | 8.5 | 8.5 | 8.4 | 8.5 | 8.4 | 7.4 |

| | Components | | | | |
|---|---|---|---|---|---|
| | E3P6 | E4P7 | E5P8 | E6P9 | E6P13 | E8P8 |
| | | | Oligomer | | | |
| | E3 | E4 | DE5 | DE6 | DE6 | DE8 |
| Oligomer (g) | 100.00 | 40.00 | 81.80 | 17.20 | 19.63 | 150.00 |
| Oligomer (% of solids) | 35.00 | 30.00 | 80.00 | 15.00 | 15.00 | 40.00 |

TABLE 5-continued

| Polymer | P6 | P7 | P7 | P8 | P9 | P8 |
|---|---|---|---|---|---|---|
| Polymer (g) | 108.70 | 174.50 | 12.20 | 86.50 | 100.00 | 325.00 |
| Polymer (% of solids) | 65.00 | 70.00 | 20.00 | 85.00 | 85.00 | 60.00 |
| Additive | — | DPM | — | Water | Water | Water |
| Additive (g) | — | 42.50 | — | 10.00 | 10.00 | 66.67 |
| Dispersion solids % | 35.6 | 20.7 | 40.6 | 40.3 | 40.3 | 45.0 |
| pH | 7.6 | 7.7 | 8.1 | 8.2 | 8.4 | 8.3 |

| | Components | | | |
|---|---|---|---|---|
| | E2U1P10 | E1E3U2P11 | E7P12 | E7P14 |
| | | Oligomer | | |
| | DE2/DU1 | DE1/DE2/DU2 | DE7 | DE7 |
| Oligomer (g) | 18.70/99.20 | 21.40/10.9/42.4 | 35.00 | 35.00 |
| Oligomer (% of solids) | 60.00 | 60.00 | 40.00 | 30.00 |
| Polymer | P10 | P11 | P12 | P14 |
| Polymer (g) | 44.80 | 31.80 | 68.50 | 94.20 |
| Polymer (% of solids) | 40.00 | 40.00 | 60.00 | 70.00 |
| Additive | — | — | Borchersdry VP0133 | BG |
| Additive (g) | — | — | 0.30 | 5.00 |
| Dispersion solids % | 30.7 | 33.0 | 43.2 | 44.6 |
| pH | 7.2 | 8.1 | 7.2 | 7.0 |

EXAMPLE 1

Pigmented Paint Composition Comprising Dispersion DE1

A 1-L 3-necked round bottom flask, equipped with a stirrer, was loaded with dispersion DE1 (130.00 g) and $TiO_2$-based pigment paste (C830; 42.10 g; solids content of 74.9%) in a nitrogen atmosphere, and the mixture was stirred for 30 minutes at ambient temperature. The resulting paint formulation had a solids content of 36.8%. Then the wetting agent (Byk 344; 0.1–0.2% on paint solids) and finally a urethane thickener (Borchigel L75N, Trademark from Bayer, approximately 1.5 g) was added until a suitable paint-viscosity was obtained (4,000 to 6,000 mPa.s). The paint formulation was left is undisturbed for 24 h, then stirred up to mix the contents intimately, checked (and when necessary corrected) for its viscosity, and finally tested on drying and other properties.

C830 is a pigment formulation comprising $TiO_2$ (24.0 g), AMP-95 (0.2 g), water (3.3 g), Dehydran 1293 (0.5 g), Surfinol 104 E (0.4 g).

Paint examples 2 to 14 and 16 (and the comparative examples C6, C8 and C10) were prepared according to similar procedures using the components presented in Table 6. Example 17 demonstrates the use of the oligomer/polymer system used in working example 14 as a working clear coat (i.e. non-pigmented) system. Example 15 uses an iron oxide pigment instead of C830. The drying and other properties of these examples are also presented in Table 6.

The water resistance of example 14 and Example 16 before recovery was 5 and after recovery was 5. The sandability of examples 7, 13 and 16 were 2.5 hours, 22 hours and 18 hours respectively.

Comparative Example 18

P5 was formulated with butyl glycol (8.48 g) and the resulting dispersion was thickened with Borchigel L75N to a viscosity of 4000 to 6000 mPa.s.

Comparative Example 19

P7 was used without further formulation.

TABLE 6

| | Example | | | | | | |
|---|---|---|---|---|---|---|---|
| | 1 | 2 | 3 | 4 | 5 | 6 | 7 |
| | | | | Binder | | | |
| | DE1 | E1P1 | E1P2 | E1P3 | E1P4 | E2P5 | E3P6 |
| Binder (g) | 130.00 | 113.50 | 118.70 | 114.20 | 131.00 | 132.10 | 208.70 |
| Pigment C830 (g) | 42.10 | 48.50 | 48.50 | 48.50 | 48.50 | 55.90 | 91.80 |
| Open Time (mins) | 140 | 30 | 50 | 45 | 50 | 32 | 28 |
| Wet edge time (mins) | 70 | 17 | 30 | 18 | 20 | 17 | 13 |
| Dust-free time (mins) | 135 | 30 | 40 | 35 | 35 | 35 | 18 |
| Tack-free time (h) | 15 | 6 | 1.5 | 2 | 2.5 | 3.5 | 0.8 |
| Thumb-hard time (h) | 24 | 24 | 6 | 9 | 6 | 6 | 2 |
| Yellowness at start | 3.69 | 3.49 | 2.78 | 3.02 | 2.6 | 2.21 | 1.62 |
| Yellowing ($\Delta$b-dark) | 6.07 | 3.77 | 3.16 | 3.46 | 2.94 | 0.16 | 0.28 |
| Yellowing ($\Delta$b-day) | 2.69 | 0.86 | 0.85 | 1.02 | 1.37 | 0.29 | 0.33 |

| | Example | | | | | |
|---|---|---|---|---|---|---|
| | 8 | 9 | 10 | 11 | 12 | 13 |
| | | | | Binder code | | |
| | E4P7 | E5 | E6 | E2U1P10 | E1E3U2P11 | E7 |
| Binder (g) | 257.00 | 94.00 | 113.70 | 162.70 | 106.60 | 103.80 |
| Pigment C830 (g) | 65.60 | 50.30 | 56.30 | 61.60 | 43.40 | 55.30 |
| Open Time (mins) | 25 | 34 | 30 | 65 | 23 | 59 |
| Wet edge time (mins) | 12 | 16 | 18 | 24 | 15 | 16 |
| Dust-free time (mins) | 45 | 140 | 25 | 30 | 30 | 30 |
| Tack-free time (h) | 2.5 | 18 | 2 | 3 | 3 | 1 |
| Thumb-hard time (h) | 3.5 | 24 | 6 | 4 | 6 | 2.5 |
| Yellowness at start | 2.18 | 5.59 | 4.85 | 4.67 | 2.6 | 2.52 |
| Yellowing ($\Delta$b-dark) | 1.47 | 4.22 | 1.27 | 2.61 | 2.27 | 0.77 |
| Yellowing ($\Delta$b-day) | 0.33 | 0.93 | −0.43 | 1.15 | 1.12 | 1.58 |

| | Example | | | | | |
|---|---|---|---|---|---|---|
| | 14 | 15 | 16 | 17 | C18 | C19 |
| | | | | Binder code | | |
| | E7P14 | E7P14 | E8 | E7P14 | P5 | P7 |
| Binder (g) | 129.20 | 85.00 | 130.00 | 81.83 | 100 | 100 |
| Pigment paste (g) C830 | 73.70 | PW602, 3.0 g | 72.01 | — | — | — |
| Open Time (mins) | 52 | 52 | 42 | 65 | 35 | 45 |
| Wet edge time (mins) | 17 | 16 | 14 | 27 | 7 | 8 |
| Dust-free time (mins) | 30 | 40 | 20 | 30 | 15 | 30 |
| Tack-free time (hours) | 0.8 | 1.3 | 1.5 | 0.8 | 1.5 | 0.5 |
| Thumb-hard time (hours) | 1 | 1.5 | 1.5 | 7 | 2 | 1 |

TABLE 6-continued

| | | | | | |
|---|---|---|---|---|---|
| Yellowness at start | 2.74 | — | 3.39 | — | — | — |
| Yellowing (Δb-dark) | 0.19 | — | 3.15 | — | — | — |
| Yellowing (Δb-day) | 0.89 | — | 1.80 | — | — | — |

Equilibrium Viscosity Data of the Examples Prepared Above

The equilibrium viscosity of the examples prepared above was measured using a number of shear rates and the results are tabulated below in Tables 7 to 25.

TABLE 7

Example 1:

| Time (min) | Calculated Solids (%) | Shear rate 0.0997 s⁻¹ viscosity (Pa · s) | Shear rate 0.990 s⁻¹ viscosity (Pa · s) | Shear rate 9.97 s⁻¹ viscosity (Pa · s) | Shear rate 78.6 s⁻¹ viscosity (Pa · s) |
|---|---|---|---|---|---|
| 2.0 | 37.04 | 16 | 14 | 9 | 7 |
| 14.0 | 40.97 | 52 | 28 | 18 | 7 |
| 30.0 | 47.27 | 394 | 258 | 74 | — |
| 34.0 | 49.27 | 1770 | 456 | 259 | — |
| 40.0 | 52.32 | 1840 | 471 | 259 | — |
| 43.5 | 54.24 | 821 | 168 | 52 | — |
| 50.0 | 57.7 | 883 | 178 | 54 | — |
| 57.0 | 61.9 | 1770 | 192 | 40 | — |
| 63.5 | 64.93 | 1700 | 193 | 42 | 20 |
| 69.0 | 66.43 | 2080 | 226 | 47 | 21 |
| 76.5 | 67.76 | 1950 | 231 | 49 | 22 |

TABLE 8

Example 2

| Time (min) | Calculated solids (%) | Shear rate 0.0997 s⁻¹ viscosity (Pa · s) | Shear rate 0.990 s⁻¹ viscosity (Pa · s) | Shear rate 9.97 s⁻¹ viscosity (Pa · s) | Shear rate 78.6 s⁻¹ viscosity (Pa · s) |
|---|---|---|---|---|---|
| 7 | 49.8 | 113.0 | 30.2 | 12.2 | 4.6 |
| 11 | 51.9 | 171.0 | 43.3 | 15.9 | 5.8 |
| 16 | 54.4 | 261.0 | 51.2 | 17.9 | 5.3 |
| 18 | 55.4 | 300.0 | 61.6 | 20.1 | 5.0 |
| 23 | 57.9 | 359.0 | 64.7 | 17.6 | 4.6 |
| 31 | 61.7 | 916.0 | 152.0 | 28.6 | 5.7 |
| 36 | 64.1 | 2640.0 | 389.0 | 60.7 | — |
| 38 | 65.0 | 2480.0 | 358.0 | 47.7 | — |
| 43 | 67.2 | 5020.0 | 646.0 | 87.9 | 18.6 |
| 48 | 69.4 | 10200.0 | 2010.0 | 213.0 | 58.2 |
| 53 | 71.6 | 22800.0 | 4610.0 | 440.0 | — |
| 62 | 75.3 | 23700.0 | 4940.0 | 691.0 | 126.0 |
| 69 | 78.0 | 33100.0 | 4770.0 | 424.0 | — |

TABLE 9

Example 3:

| Time (min) | Calculated Solids (%) | Shear rate 0.0997 s⁻¹ viscosity (Pa · s) | Shear rate 0.990 s⁻¹ viscosity (Pa · s) | Shear rate 9.97 s⁻¹ viscosity (Pa · s) | Shear rate 78.6 s⁻¹ Viscosity (Pa · s) |
|---|---|---|---|---|---|
| 3.0 | 45.22 | 176 | 46 | 17 | 7 |
| 11.0 | 48.71 | 358 | 65 | 26 | 10 |
| 22.0 | 53.91 | 513 | 103 | 52 | 15 |
| 28.5 | 57.22 | 427 | 159 | 70 | — |
| 35.0 | 60.69 | 1630 | 363 | 75 | — |
| 40.0 | 63.48 | 2460 | 515 | — | — |
| 46.0 | 66.95 | 2390 | 492 | 105 | — |
| 52.0 | 70.57 | 11100 | — | — | — |

TABLE 10

Example 4:

| Time (min) | Calculated Solids (%) | Shear rate 0.0997 s⁻¹ viscosity (Pa · s) | Shear rate 0.990 s⁻¹ viscosity (Pa · s) | Shear rate 9.97 s⁻¹ viscosity (Pa · s) | Shear rate 78.6 s⁻¹ viscosity (Pa · s) |
|---|---|---|---|---|---|
| 1.0 | 45.01 | 126 | 23 | 11 | 4 |
| 7.0 | 47.50 | 113 | 25 | 13 | 5 |
| 13.0 | 50.14 | 235 | 44 | 22 | 9 |
| 17.5 | 52.21 | 153 | 52 | 27 | 11 |
| 24.0 | 55.36 | 275 | 104 | 48 | 19 |
| 28.0 | 57.39 | 337 | 134 | 56 | — |
| 34.0 | 60.57 | 1530 | 303 | 76 | — |
| 39.0 | 63.36 | 2520 | 482 | 117 | — |
| 46.0 | 67.48 | 18200 | 3890 | 285 | — |
| 52.0 | 71.22 | 30800 | 8070 | — | — |
| 57.0 | 74.50 | 28000 | — | — | — |

TABLE 11

Example 5:

| Time (min) | Calculated Solids (%) | Shear rate 0.0997 s⁻¹ viscosity (Pa · s) | Shear rate 0.990 s⁻¹ viscosity (Pa · s) | Shear rate 9.97 s⁻¹ viscosity (Pa · s) | Shear rate 78.6 s⁻¹ Viscosity (Pa · s) |
|---|---|---|---|---|---|
| 0.0 | 41.06 | 187 | 50 | 17 | 8 |
| 7.0 | 43.17 | 275 | 54 | 21 | 9 |
| 13.0 | 45.22 | 424 | 92 | 35 | 13 |
| 19.0 | 47.47 | 727 | 163 | 53 | 17 |
| 23.5 | 49.29 | 594 | 152 | 50 | 129 |
| 30.0 | 52.13 | 1920 | 543 | 122 | — |
| 34.5 | 54.25 | 3160 | 699 | 165 | — |
| 40.0 | 56.99 | 6840 | 1030 | 255 | — |
| 44.0 | 59.09 | 9840 | 1520 | 300 | — |
| 50.0 | 62.42 | 41100 | — | — | — |

TABLE 12

Example 6

| Time (min) | Calculated solids (%) | Shear rate 0.0997 s⁻¹ viscosity (Pa · s) | Shear rate 0.990 s⁻¹ viscosity (Pa · s) | Shear rate 9.97 s⁻¹ viscosity (Pa · s) | Shear rate 78.6 s⁻¹ viscosity (Pa · s) |
|---|---|---|---|---|---|
| 7 | 50.5 | 33.7 | 14.3 | 8.0 | 6.3 |
| 18 | 57.0 | 43.8 | 23.6 | 13.5 | 8.6 |
| 23 | 60.1 | 74.9 | 31.7 | 17.8 | 8.5 |
| 28 | 63.2 | 130.0 | 55.1 | 28.3 | 13.2 |
| 33 | 66.4 | 293.0 | 97.6 | 47.0 | 17.1 |
| 39 | 70.4 | 871.0 | 186.0 | 84.9 | 48.0 |
| 44 | 73.8 | 1630.0 | 582.0 | 402.0 | 288.0 |
| 52 | 79.3 | 3060.0 | 1140.0 | 626.0 | 250.0 |
| 58 | 83.6 | 66200.0 | — | — | — |

TABLE 13

Example 7

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 7  | 50.5 | 382.0   | 51.0   | 22.9  | 12.1 |
| 13 | 53.2 | 260.0   | 52.0   | 24.5  | 15.6 |
| 18 | 55.6 | 1140.0  | 106.0  | 49.1  | 16.8 |
| 23 | 58.2 | 876.0   | 92.2   | 51.8  | —    |
| 28 | 60.9 | 2760.0  | 268.0  | 98.3  | 20.5 |
| 39 | 67.3 | 18300.0 | 3490.0 | 722.0 | —    |
| 44 | 70.4 | —       | —      | —     | —    |
| 46 | 71.6 | 13000.0 | 2190.0 | 443.0 | —    |
| 51 | 74.9 | —       | —      | —     | —    |

TABLE 14

Example 8

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 6  | 39.4 | 27   | 17   | 6   | 2   |
| 10 | 40.7 | 49   | 22   | 7   | 2   |
| 19 | 43.9 | 363  | 90   | 18  | —   |
| 22 | 45.1 | 854  | 136  | 27  | —   |
| 31 | 48.6 | 243  | 46   | 18  | 33  |
| 36 | 50.8 | 580  | 97   | 108 | 73  |
| 42 | 53.4 | 3160 | 1140 | 521 | 94  |
| 51 | 57.6 | 2580 | 1790 | 592 | 108 |
| 57 | 60.6 | 3130 | 2770 | 900 | 323 |

TABLE 15

Example 9

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 3   | 52.5 | 22.5   | 15.2  | 9.4   | 7.8  |
| 7   | 54.0 | 34.9   | 20.9  | 13.2  | 10.8 |
| 15  | 56.8 | 67.3   | 35.7  | 21.4  | 17.1 |
| 18  | 57.8 | 184.0  | 62.4  | 24.1  | 16.6 |
| 25  | 59.9 | 115.0  | 47.1  | 25.2  | 18.3 |
| 29  | 61.0 | 114.0  | 44.7  | 26.6  | 19.5 |
| 35  | 62.5 | 298.0  | 78.5  | 34.4  | 22.2 |
| 41  | 63.9 | 435.0  | 94.7  | 39.8  | 24.2 |
| 47  | 65.0 | 529.0  | 113.0 | 46.5  | 26.3 |
| 54  | 66.2 | 688.0  | 138.0 | 56.5  | 30.1 |
| 60  | 67.0 | 836.0  | 167.0 | 65.5  | 32.7 |
| 65  | 67.6 | 907.0  | 181.0 | 67.9  | 32.5 |
| 68  | 67.9 | 948.0  | 189.0 | 74.0  | 33.8 |
| 73  | 68.3 | 1080.0 | 197.0 | 76.9  | —    |
| 81  | 68.6 | 1130.0 | 233.0 | 91.0  | 36.1 |
| 93  | 68.6 | 1540.0 | 322.0 | 133.0 | —    |
| 98  | 68.4 | 1530.0 | 334.0 | 133.0 | —    |
| 103 | 68.1 | 1680.0 | 344.0 | 134.0 | —    |
| 108 | 67.7 | 1630.0 | 347.0 | 140.0 | —    |

TABLE 16

Example 10

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 4  | 40.9 | 231.0   | 25.9   | 10.5   | 4.5  |
| 7  | 42.4 | 174.0   | 34.9   | 12.7   | 3.7  |
| 15 | 46.2 | 318.0   | 61.6   | 24.6   | 6.4  |
| 18 | 47.7 | 307.0   | 80.3   | 32.1   | 7.7  |
| 26 | 51.7 | 604.0   | 136.0  | 54.9   | 11.1 |
| 32 | 54.7 | 1360.0  | 239.0  | 70.2   | 9.5  |
| 37 | 57.3 | 2200.0  | 354.0  | 71.3   | 8.0  |
| 43 | 60.4 | 9600.0  | 1040.0 | —      | —    |
| 50 | 64.2 | 21100.0 | 2220.0 | 650.0  | —    |
| 55 | 66.9 | 43500.0 | 8390.0 | 1700.0 | —    |

TABLE 17

Example 11

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 3  | 43.64 | 27.6   | 9.2   | 3.7  | 2.0 |
| 9  | 45.57 | 32.0   | 17.4  | 5.5  | 2.8 |
| 13 | 46.91 | 72.0   | 21.8  | 7.1  | 3.9 |
| 19 | 48.99 | 59.0   | 19.3  | 7.8  | 4.4 |
| 25 | 51.17 | 111.0  | 34.1  | 13.4 | 6.2 |
| 31 | 53.44 | 201.0  | 48.3  | 19.8 | 7.7 |
| 36 | 55.41 | 358.0  | 72.9  | 26.9 | 9.1 |
| 44 | 58.69 | 695.0  | 134.0 | 37.2 | —   |
| 49 | 60.82 | 911.0  | 176.0 | 45.5 | —   |
| 54 | 63.02 | 1960.0 | 338.0 | —    | —   |
| 61 | 66.21 | 5150.0 | 768.0 | —    | —   |

TABLE 18

Example 12

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 6  | 47.9 | 99.1    | 33.7   | 18.6   | 9.7   |
| 11 | 51.0 | 162.0   | 49.7   | 25.7   | 12.3  |
| 13 | 52.2 | 234.0   | 57.7   | 28.8   | 11.9  |
| 19 | 55.8 | 426.0   | 76.2   | 33.4   | 13.7  |
| 28 | 61.0 | 588.0   | 107.0  | 40.1   | 14.1  |
| 38 | 66.5 | 2620.0  | 316.0  | 63.5   | 12.1  |
| 44 | 69.6 | 13600.0 | 1500.0 | —      | —     |
| 46 | 70.6 | 14100.0 | 1200.0 | 1510.0 | 51.3  |
| 53 | 74.1 | 54900.0 | 4740.0 | 152.0  | 118.0 |
| 58 | 76.5 | 70900.0 | 6040.0 | 617.0  | 177.0 |

TABLE 19

Example 13

| Time (min) | Calculated solids (%) | Shear rate 0.0997 s$^{-1}$ viscosity (Pa·s) | Shear rate 0.990 s$^{-1}$ viscosity (Pa·s) | Shear rate 9.97 s$^{-1}$ viscosity (Pa·s) | Shear rate 78.6 s$^{-1}$ viscosity (Pa·s) |
|---|---|---|---|---|---|
| 2  | 55.35 | 13.90  | 13.00 | 10.40 | 3.21 |
| 7  | 57.43 | 55.10  | 24.60 | 15.90 | 4.52 |
| 14 | 60.62 | 92.90  | 41.70 | 24.50 | —    |
| 18 | 62.60 | 170.00 | 36.90 | 27.70 | 7.50 |

TABLE 19-continued

Example 13

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 25 | 66.32 | 233.00 | 63.40 | 42.60 | 11.40 |
| 30 | 69.18 | 481.00 | 85.10 | 54.50 | 15.20 |
| 37 | 73.47 | 868.00 | 152.00 | 75.10 | 41.10 |
| 41 | 76.07 | 1890.00 | 288.00 | 97.80 | — |
| 47 | 80.18 | 3310.00 | 463.00 | 107.00 | — |
| 51 | 83.05 | 17000.00 | 2010.00 | 264.00 | — |

TABLE 20

Example 14

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.00 | 56.57 | 33.80 | 11.90 | 5.66 | 6.26 |
| 7.50 | 59.61 | 44.40 | 15.30 | 7.53 | 4.42 |
| 14.50 | 63.48 | 97.20 | 20.30 | 9.84 | 6.30 |
| 19.50 | 66.24 | 87.70 | 27.70 | 13.10 | 7.49 |
| 25.00 | 69.28 | 634.00 | 31.30 | 16.30 | 8.93 |
| 30.00 | 72.04 | 584.00 | 49.20 | 26.30 | 13.10 |
| 37.00 | 75.90 | 982.00 | 80.90 | 33.00 | 15.30 |
| 42.50 | 78.94 | 2410.00 | 218.00 | 51.90 | — |
| 49.00 | 82.53 | 3240.00 | 208.00 | 65.20 | 23.90 |

TABLE 21

Example 15

| Time (min) | Calculated solids (%) | Shear rate 0.0997 s$^{-1}$ viscosity (Pa · s) | Shear rate 0.990 s$^{-1}$ Viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 1.00 | 45.34 | 94.90 | 43.10 | 24.00 | — |
| 1.00 | 45.34 | 135.00 | 54.30 | 28.00 | 5.51 |
| 10.50 | 48.94 | 183.00 | 84.70 | 48.80 | 10.20 |
| 14.50 | 50.70 | 249.00 | 119.00 | 67.60 | 13.10 |
| 20.00 | 53.36 | 285.00 | 140.00 | 81.90 | — |
| 24.00 | 55.46 | 470.00 | 219.00 | 107.00 | — |
| 28.50 | 58.00 | 612.00 | 277.00 | 132.00 | — |
| 35.00 | 61.98 | 1020.00 | 448.00 | 178.00 | — |
| 38.50 | 64.29 | 1250.00 | 434.00 | — | — |
| 41.50 | 66.35 | 2020.00 | 805.00 | — | — |
| 47.00 | 70.34 | 2210.00 | 867.00 | — | — |
| 51.00 | 73.41 | 4620.00 | 1250.00 | — | — |
| 55.00 | 76.63 | 5760.00 | 1550.00 | — | — |
| 61.00 | 81.73 | 17300.00 | — | — | — |

TABLE 22

Example 16

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2.00 | 56.54 | — | 30.20 | 10.90 | 4.11 |
| 6.00 | 58.39 | 213.00 | 41.40 | 13.90 | 4.73 |
| 12.00 | 61.07 | 347.00 | 49.60 | 15.00 | 5.59 |
| 16.50 | 63.02 | 371.00 | 58.20 | 15.90 | 6.33 |
| 21.50 | 65.10 | 630.00 | 105.00 | 25.40 | 8.83 |
| 26.00 | 66.92 | 689.00 | 115.00 | 27.60 | — |

TABLE 22-continued

Example 16

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 32.00 | 69.24 | 975.00 | 177.00 | 35.80 | 9.42 |
| 36.00 | 70.73 | — | 227.00 | 54.50 | — |
| 43.00 | 73.22 | 1310.00 | 202.00 | 56.80 | — |
| 49.00 | 75.24 | 1640.00 | 213.00 | — | — |
| 55.00 | 77.15 | 3550.00 | 433.00 | 101.00 | — |
| 60.00 | 78.66 | 6680.00 | — | — | — |
| 66.00 | 80.37 | 85400.00 | — | — | — |

TABLE 23

Example 17

| Time (min) | Calculated solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 2 | 42.43 | 55.00 | 26.10 | 16.40 | 3.64 |
| 6 | 43.93 | 76.50 | 35.50 | 19.10 | 4.03 |
| 10 | 45.16 | 98.70 | 45.70 | 24.90 | 5.26 |
| 15 | 46.93 | 126.00 | 60.30 | 32.90 | 7.19 |
| 20 | 48.69 | 156.00 | 76.90 | 41.30 | 8.60 |
| 25 | 50.76 | 210.00 | 102.00 | 53.70 | 7.31 |
| 30 | 53.01 | 210.00 | 132.00 | 73.00 | 14.50 |
| 35 | 55.37 | 257.00 | 129.00 | 96.30 | 17.60 |
| 40 | 57.64 | — | 206.00 | 127.00 | 10.80 |
| 45 | 60.32 | 593.00 | 340.00 | 138.00 | 8.50 |
| 50 | 63.27 | 1160.00 | 489.00 | 184.00 | 9.19 |
| 55 | 66.53 | 2350.00 | 686.00 | 257.00 | 3.66 |
| 60 | 70.14 | 2740.00 | 920.00 | 244.00 | 33.50 |
| 65 | 73.99 | 9100.00 | 1300.00 | 302.00 | 48.40 |

TABLE 24

Example C18

| Time (min) | Calculated Solids (%) | Shear rate 0.0997 s$^{-1}$ Viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 3.0 | 41.74 | 506 | 104 | 16 | 3 |
| 9.0 | 46.28 | 1465 | 341 | 59 | 13 |
| 14.5 | 50.99 | 5043 | 1334 | 305 | 51 |
| 23.0 | 59.16 | 16240 | 5356 | 910 | 193 |
| 29.0 | 65.50 | 22290 | 12750 | 2040 | 448 |

TABLE 25

Example C19

| Time (min) | Calculated Solids (%) | Shear rate 0.0997 s$^{-1}$ viscosity (Pa · s) | Shear rate 0.990 s$^{-1}$ viscosity (Pa · s) | Shear rate 9.97 s$^{-1}$ viscosity (Pa · s) | Shear rate 78.6 s$^{-1}$ viscosity (Pa · s) |
|---|---|---|---|---|---|
| 0. | 22.20 | 68 | 28 | 10 | 3 |
| 5.0 | 24.03 | 120 | 56 | 18 | 4 |
| 12.0 | 26.54 | 1156 | 422 | 82 | 15 |
| 18.0 | 28.93 | 5804 | 1588 | 212 | 33 |
| 24.0 | 31.81 | 8118 | 2073 | 289 | 69 |
| 31.0 | 36.13 | 12560 | 4273 | 568 | 116 |
| 38.0 | 41.88 | 12720 | 3278 | 415 | 78 |
| 44.0 | 48.27 | 33020 | 8738 | 1087 | 186 |

The invention claimed is:

1. An aqueous coating composition comprising an ambient temperature crosslinkable water-dispersible polyester oligomer(s) and a dispersed polymer(s) having a measured weight average molecular weight ≧120,000 Daltons where the ratio of crosslinkable polyester oligomer(s) to the dispersed polymer(s) is in the range of from 90:10 to 20:80, and from 0 to 25% of co-solvent by weight of the composition, and wherein said composition when drying to form a coating has the following properties:
   i) an open time of at least 20 minutes at 23±2° C.;
   ii) a wet edge time of at least 10 minutes at 23±2° C.;
   iii) a thumb hard time of ≦48 hours at 23±20° C.;
   iv) a tack-free time of ≦20 hours at 23±2° C.; and
   v) an equilibrium viscosity of ≦3,000 Pa.s, at any solids content when drying in the range of from 20 to 55% by weight of the composition, using any shear rate in the range of from 9±0.5 to 90±5 s$^{-1}$ and at 23±2° C.; and
wherein the crosslinkable polyester oligomer(s) is ≦80% by weight soluble in water throughout a pH range of from 2 to 10, and has an acid value in the range of from 0 to 90 mg KOH/g.

2. An aqueous coating composition comprising:
   i) 3 to 26% of a crosslinkable oligomer(s) by weight of the composition of which at least 52 wt % is an ambient temperature crosslinkable water-dispersible polyester oligomer(s);
   ii) 0 to 6.5% of a non-crosslinkable oligomer(s) by weight of the composition;
   iii) 10 to 56% of dispersed polymer(s) by weight of the composition, said dispersed polymer(s) having a measured weight average molecular weight ≧120,000 Daltons;
   iv) 0 to 25% of co-solvent by weight of the composition;
   v) 5 to 65% of water by weight of the composition;
where i)+ii)+iii)+iv)+v)=100%; and
wherein said composition when drying to form a coating has the following properties:
   i) an open time of at least 20 minutes at 23±2° C.;
   ii) a wet edge time of at least 10 minutes at 23±2° C.;
   iii) a thumb hard time of ≦48 hours at 23±2° C.;
   iv) a tack-free time of ≦20 hours at 23±2° C.; and
   v) an equilibrium viscosity of ≦3,000 Pa.s, at any solids content when drying in the range of from 20 to 55% by weight of the composition, using any shear rate in the range of from 9±0.5 to 90±5 s$^{-1}$ and at 23±2° C.; and
wherein the crosslinkable polyester oligomer(s) is 80% by weight soluble in water throughout a pH range of from 2 to 10; and has an acid value in the range of from 0 to 90 mg KOH/g.

3. An aqueous coating composition according to claim 1 or claim 2 wherein said polyester oligomer(s) has a solution viscosity ≦250 Pa.s, as determined from a 70% by weight solids solution of the crosslinkable polyester oligomer(s) in a solvent mixture consisting of:
   i) at least one of the solvents selected from the group consisting of N-methylpyrrolidone, n-butylglycol and mixtures thereof;
   ii) water and
   iii) N,N-dimethylethanolamine;
   where i), ii) and iii) are in weight ratios of 20/7/3 respectively, using a shear rate of 90±5 s$^{-1}$ and at 23±2° C.

4. An aqueous coating composition according to claim 1 or claim 2 wherein said polyester oligomer(s) has a solution viscosity ≦150 Pa.s, as determined from a 80% by weight solids solution of the crosslinkable polyester oligomer(s) in at least one of the solvents selected from the group consisting of N-methylpyrrolidone, n-butylglycol and mixtures thereof, using a shear rate of 90±5 s$^{-1}$ and at 50±2° C.

5. An aqueous composition according to any one of claim 1 or 2 wherein said composition has an equilibrium viscosity ≦5,000 Pa.s when measured using any shear rate in the range of from 0.09±0.005 to 90±5 s$^{-1}$, and an equilibrium viscosity of ≦3,000 Pa.s when measured using any shear rate in the range of from 0.9±0.05 to 90±5 s$^{-1}$, and an equilibrium viscosity of ≦1,500 Pa.s when measured using any shear rate in the range of from 9±0.5 to 90±5 s$^{-1}$, at any solids content when drying in the range of from 20 to 55% by weight of the composition and at 23±2° C.

6. An aqueous composition according to any one of claim 1 or 2 wherein said composition has an equilibrium viscosity ≦5,000 Pa.s when measured using a shear rate in the range of from 0.09±0.005 to 90±5 s$^{-1}$ after a 12% increase of the solids content by weight of the composition when drying.

7. An aqueous composition according to any one of claim 1 or 2 wherein the crosslinkable polyester oligomer(s) has a measured weight average molecular weight in the range of from 1,000 to 100,000 Daltons.

8. An aqueous composition according to any one of claim 1 or 2 wherein the crosslinkable polyester oligomer(s) has a PDi≦30.

9. An aqueous composition according to any one of claim 1 or 2 wherein the crosslinkable polyester oligomer(s) has a measured Tg in the range of from −90 to 100° C.

10. An aqueous composition according to any one of claim 1 or 2 wherein the crosslinkable water-dispersible polyester oligomer(s) is self-crosslinkable.

11. An aqueous composition according to any one of claim 1 or 2 wherein the crosslinkable water-dispersible polyester oligomer(s) is crosslinkable by autoxidation optionally in combination with Schiff base crosslinking.

12. An aqueous composition according to claim 11 wherein the crosslinkable water-dispersible polyester oligomer(s) contains autoxidisable groups and carbonyl functional groups.

13. An aqueous composition according to any one of claim 1 or 2 wherein the crosslinkable water-dispersible polyester oligomer(s) is crosslinkable by Schiff base crosslinking optionally in combination with silane condensation.

14. An aqueous composition according to any one of claim 1 or 2 wherein the crosslinkable water-dispersible polyester oligomer(s) is crosslinkable by silane condensation optionally in combination with autoxidation.

15. An aqueous composition according to claim 1 or claim 2 wherein the dispersed polymer(s) has particle size in the range of from 25 to 1000 nm.

16. An aqueous composition according to claim 1 or claim 2 wherein the dispersed polymer(s) has an acid value below 150 mgKOH/g.

17. An aqueous composition according to claim 1 or claim 2 wherein the dispersed polymer(s) is a vinyl polymer.

18. An aqueous composition according to claim 17 wherein the dispersed polymer(s) has a measured Tg in the range of from −50 to 300° C.

19. An aqueous coating composition according to claim 1 or claim 2 comprising:
   i) 0 to 15% co-solvent by weight of crosslinkable oligomer(s), non-crosslinkable oligomer(s) and dispersed polymer(s);
   ii) 35 to 65% of crosslinkable polyester oligomer(s) by weight of crosslinkable oligomer(s), non-crosslinkable oligomer(s) and dispersed polymer(s); wherein the crosslinkable polyester oligomer(s) comprises 45 to 75 wt % of fatty acid groups; and wherein the dispersed polymer(s) has an acid value below 20 mgKOH/g.

20. An aqueous coating composition according to any one of claim 1 or 2 additionally comprising a pigment.

21. A substrate having a coating obtained from an aqueous composition according to any one of claim 1 or 2.

22. An aqueous coating composition comprising an ambient temperature crosslinkable water-dispersible polyester oligomer(s) and a dispersed polymer(s) having a measured weight average molecular weight <120,000 Daltons where the ratio of crosslinkable polyester oligomer(s) to the dispersed polymer(s) is in the range of from 90:10 to 20:80, and from 0 to 25% of co-solvent by weight of the composition, and wherein said composition when drying to form a coating has the following properties:
   i) an open time of at least 20 minutes at 23±2° C.;
   ii) a wet edge time of at least 10 minutes at 23±2° C.;
   iii) a thumb hard time of ≦48 hours at 23±2° C.;
   iv) a tack-free time of ≦20 hours at 23±2° C.; and
   v) an equilibrium viscosity of ≦3,000 Pa.s, at any solids content when drying in the range of from 20 to 55% by weight of the composition, using any shear rate in the range of from 9±0.5 to 90±5 s$^{-1}$ and at 23±2° C.; and;
wherein the crosslinkable polyester oligomer(s) is ≦80% by weight soluble in water throughout a pH range of from 2 to 10, and has an acid value in the range of from 0 to 90 mg KOH/g with the proviso that the dispersed polymer(s) is a vinyl polymer and has a solid viscosity >150 Pa.s, as determined from an 80% by weight solids solution of the dispersed polymer(s) in at least one of the solvents selected from the group consisting of N-methylpyrrolidone, n-butylglycol and mixtures thereof, using a shear ate of 90±5 s$^{-1}$ and at 50±2° C.

23. An aqueous coating composition comprising an ambient temperature crosslinkable water-dispersible polyester oligomer(s) and a dispersed polymer(s) having a measured weight average molecular weight <120,000 Daltons where the ratio of crosslinkable polyester oligomer(s) to the dispersed polymer(s) is in the range of from 90:10 to 20:80, and from 0 to 25% of co-solvent by weight of the composition, and wherein said composition when drying to form a coating has the following properties:
   i) an open time of at least 20 minutes at 23±2° C.;
   ii) a wet edge time of at least 10 minutes at 23±2° C.;
   iii) a thumb hard time of ≦48 hours at 23±2° C.;
   iv) a tack-free time of ≦20 hours at 23±2° C.; and
   v) an equilibrium viscosity of ≦3,000 Pa.s, at any solids content when drying in the range of from 20 to 55% by weight of the composition, using any shear rate in the range of from 9±0.5 to 90±5 s$^{-1}$ and at 23±2° C.; and;
wherein the crosslinkable polyester oligomer(s) is ≦80% by weight soluble in water throughout a pH range of from 2 to 10, and has an acid value in the range of from 0 to 90 mg KOH/g with the proviso that the dispersed polymer(s) has a solution viscosity ≧250 Pa.s, as determined from an 80% by weight solids solution of the dispersed polymer(s) in at least one of the solvents selected from the group consisting of N-methylpyrrolidone, n-butylglycol and mixtures thereof, using a shear rate of 90±5 s$^{-1}$ and at 50±2° C. and with the further proviso that the crosslinkable water-dispersible polyester oligomer(s) is selected from the group consisting of such polyester oligomer(s) that are self-crosslinkable, crosslinkable by autooxidation, crosslinkable by Schiff base crosslinking or crosslinkable by silane condensation and with the further proviso that said polyester oligomer(s) has a solution viscosity ≦150 Pa.s, as determined from a 80% by weight solids solution of the crosslinkable polyester oligomer(s) in at least one of the solvents selected from the group consisting of N-methylpyrrolidone, n-butylglycol and mixtures thereof, using a shear rate of 90±5 s$^{-1}$ and at 50±2° C.

24. An aqueous coating composition comprising:
   i) 14 to 40% of ambient temperature crosslinkable water-dispersible oligomer(s) by weight of crosslinkable oligomer(s), non-crosslinkable oligomer(s) and dispersed polymer(s) of which at least 52 wt % is crosslinkable polyester oligomer(s);
   ii) 0 to 10% of a non-crosslinkable oligomer(s) by weight of crosslinkable oligomer(s), non-crosslinkable oligomer(s) and dispersed polymer(s);
   iii) 50 to 85% of dispersed polymer(s) by weight of crosslinkable oligomer(s), non-crosslinkable oligomer(s) and dispersed polymer(s); said dispersed polymer(s) having a measured weight average molecular weight ≧120,000 Daltons and
where i)+ii)+iii)=100%, and
   iv) 0 to 25% of co-solvent by weight of the composition, said composition when drying to form a coating having the following properties:
   i) an open time of at least 20 minutes at 23±2° C.;
   ii) a wet edge time of at least 10 minutes at 23±2° C.;
   iii) a thumb hard time of ≦48 hours at 23±2° C.;
   iv) a tack-free time of ≦20 hours at 23±2° C.; and
   v) an equilibrium viscosity of ≦3,000 Pa.s, at any solids content when drying in the range of from 20 to 55% by weight of the composition, using any shear rate in the range of from 9±0.5 to 90±5 s$^{-1}$ and at 23+2° C.; and wherein the crosslinkable polyester oligomer(s) is ≦80% by weight soluble in water throughout a pH range of from 2 to 10, and has an acid value in the range of from 0 to 90 mg KOH/g.

25. An aqueous coating composition comprising:
   i) 3 to 26% of a crosslinkable oligomer(s) by weight of the composition of which at least 52 wt % is an ambient temperature crosslinkable water-dispersible polyester oligomer(s);
   ii) 0 to 6.5% of a non-crosslinkable oligomer(s) by weight of the composition;
   iii) 10 to 56% of dispersed polymer(s) by weight of the composition, said dispersed polymer(s) having a measured weight average molecular weight <120,000 Daltons;
   iv) 0 to 25% of co-solvent by weight of the composition;
   v) 5 to 65% of water by weight of the composition;
where i)+ii)+iii)+iv)+v)=100%; and
wherein said composition when drying to form a coating has the following properties:
   i) an open time of at least 20 minutes at 23±2° C.;
   ii) a wet edge time of at least 10 minutes at 23±2° C.;
   iii) a thumb hard time of ≦48 hours at 23±2° C.;
   iv) a tack-free time of ≦20 hours at 23±2° C.; and
   v) an equilibrium viscosity of ≦3,000 Pa.s, at any solids content when drying in the range of from 20 to 55% by weight of the composition, using any shear rate in the range of from 9±0.5 to 90±5 s$^{-1}$ and at 23±2° C.; and
wherein the crosslinkable polyester oligomer(s) is 80% by weight soluble in water throughout a pH range of from 2 to 10, and has an acid value in the range of from 0 to 90 mg KOH/g with the proviso that the dispersed polymer(s) is vinyl polymer and has a solution viscosity >150 Pa.s, as determined from an 80% by weight solids solution of the dispersed polymer(s) in at least one of the solvents selected from the group consisting of N-methylpyrrolidone, n-butylglycol and mixtures thereof, using a shear rate of 90±5 s$^{-1}$ and at 50±2° C.

26. An aqueous coating composition comprising:
  i) 3 to 26% of a crosslinkable oligomer(s) by weight of the composition of which at least 52 wt % is an ambient temperature crosslinkable water-dispersible polyester oligomer(s);
  ii) 0 to 6.5% of a non-crosslinkable oligomer(s) by weight of the composition;
  iii) 10 to 56% of dispersed polymer(s) by weight of the composition, said dispersed polymer(s) having a measured weight average molecular weight ≧120,000 Daltons;
  iv) 0 to 25% of co-solvent by weight of the composition;
  v) 5 to 65% of water by weight of the composition;
where i)+ii)+iii)+iv)+v)=100%; and
wherein said composition when drying to form a coating has the following properties:
  i) an open time of at least 20 minutes at 23±2° C.;
  ii) a wet edge time of at least 10 minutes at 23±2° C.;
  iii) a thumb hard time of ≦48 hours at 23±2° C.;
  iv) a tack-free time of ≦20 hours at 23±2° C.; and
  v) an equilibrium viscosity of ≦3,000 Pa.s, at any solids content when drying in the range of from 20 to 55% by weight of the composition, using any shear rate in the range of from 9±0.5 to 90±5 s$^{-1}$ and at 23±2° C; and
wherein the crosslinkable polyester oligomer(s) is ≦80% by weight soluble in water throughout a pH range of from 2 to 10, and has an acid value in the range of from 0 to 90 mg KOH/g with the proviso that the dispersed polymer(s) has a solution viscosity ≧250 Pa.s, as determined from an 80% by weight solids solution of the dispersed polymer(s) in at least one of the solvents selected from the group consisting of N-methylpyrrolidone, n-butylglycol and mixtures thereof, using a shear rate of 90±5 s$^{-1}$ and at 50±2° C. and with the further proviso that the crosslinkable water-dispersible polyester oligomer(s) is selected from the group consisting of such polyester oligomer(s) that are self-crosslinkable, crosslinkable by autooxidation, crosslinkable by Schiff base crosslinking or crosslinkable by silane condensation and with the further proviso that said polyester oligomer(s) has a solution viscosity ≦150 Pa.s, as determined from a 80% by weight solids solution of the crosslinkable polyester oligomer(s) in at least one of the solvents selected from the group consisting of N-methylpyrrolidone, n-butylglycol and mixtures thereof, using a shear rate of 90±5 s$^{-1}$ and at 50±2° C.

* * * * *

UNITED STATES PATENT AND TRADEMARK OFFICE
CERTIFICATE OF CORRECTION

| | | |
|---|---|---|
| PATENT NO. | : 7,022,759 B2 | Page 1 of 1 |
| APPLICATION NO. | : 10/380952 | |
| DATED | : April 4, 2006 | |
| INVENTOR(S) | : Martin et al. | |

It is certified that error appears in the above-identified patent and that said Letters Patent is hereby corrected as shown below:

Col. 45, line 47, change "80%" to read --$\leq 80\%$--.

Col. 48, line 61, change "80%" to read --$\leq 80\%$--.

Signed and Sealed this

Eighteenth Day of September, 2007

JON W. DUDAS
*Director of the United States Patent and Trademark Office*